US012253995B2

(12) United States Patent
Sun et al.

(10) Patent No.: US 12,253,995 B2
(45) Date of Patent: Mar. 18, 2025

(54) INCREASING INDEX AVAILABILITY IN DATABASES

(71) Applicant: International Business Machines Corporation, Armonk, NY (US)

(72) Inventors: Sheng Yan Sun, Beijing (CN); Shuo Li, Beijing (CN); Xiaobo Wang, Beijing (CN); Xin Peng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 17/304,454

(22) Filed: Jun. 21, 2021

(65) Prior Publication Data
US 2022/0405263 A1 Dec. 22, 2022

(51) Int. Cl.
*G06F 16/22* (2019.01)
*G06F 16/23* (2019.01)

(52) U.S. Cl.
CPC ...... *G06F 16/2282* (2019.01); *G06F 16/2246* (2019.01); *G06F 16/2379* (2019.01)

(58) Field of Classification Search
CPC ............. G06F 16/2282; G06F 16/2379; G06F 16/2246
USPC ........................................................ 707/696
See application file for complete search history.

(56) References Cited

U.S. PATENT DOCUMENTS

| 4,507,752 | A | * | 3/1985 | McKenna | ........... G06F 16/9024 |
| | | | | | 708/203 |
| 5,375,235 | A | * | 12/1994 | Berry | .................. G06F 16/9017 |
| | | | | | 707/999.005 |
| 5,551,027 | A | * | 8/1996 | Choy | .................. G06F 16/2228 |
| | | | | | 711/216 |
| 5,717,912 | A | * | 2/1998 | Millett | .................. G06F 16/322 |
| | | | | | 707/693 |

(Continued)

FOREIGN PATENT DOCUMENTS

| WO | 2012134122 A2 | 10/2012 |
| WO | 2018120933 A1 | 7/2018 |

OTHER PUBLICATIONS

Stellato, "Finding Performance Benefits with Partitioning," SQL Sentry, LLC., Sep. 10, 2013, 8 pages. https://sqlperformance.com/2013/09/sql-indexes/partitioning-benefits.

(Continued)

*Primary Examiner* — Sherief Badawi
*Assistant Examiner* — Jessica N Le
(74) *Attorney, Agent, or Firm* — Yee & Associates, P.C.

(57) ABSTRACT

Increasing index search efficiency and availability in a database is provided. An index space matrix corresponding to a plurality of mini-indices of the database is built using ordered boundary values that correspond to key value ranges of each respective mini-index to increase index search efficiency by removing redundant mini-index accesses. Mini-indices of the plurality of mini-indices are consolidated asynchronously without suspending access to the mini-indices using a particular consolidation policy of a (Continued)

plurality of consolidation policies that corresponds to an amount of key value overlap identified between the mini-indices. Data operations corresponding to transactions are performed using the index space matrix during consolidation of the mini-indices without suspending access to the mini-indices.

21 Claims, 24 Drawing Sheets

(56) References Cited

U.S. PATENT DOCUMENTS

| | | | | |
|---|---|---|---|---|
| 5,742,806 | A * | 4/1998 | Reiner | G06F 16/24532 711/216 |
| 6,026,406 | A * | 2/2000 | Huang | G06F 16/2343 |
| 7,792,839 | B2 * | 9/2010 | Hrle | G06F 16/2272 707/808 |
| 7,885,967 | B2 * | 2/2011 | Schneider | G06F 16/2246 707/696 |
| 8,117,464 | B1 * | 2/2012 | Kogelnik | H04L 67/1097 713/180 |
| 8,380,702 | B2 | 2/2013 | Baby et al. | |
| 8,386,447 | B2 * | 2/2013 | Simon | G06F 16/2228 707/696 |
| 9,690,799 | B2 * | 6/2017 | Schreter | G06F 16/1744 |
| 10,379,959 | B1 | 8/2019 | Franklin | H04L 67/1097 |
| 10,860,558 | B2 | 12/2020 | Vemulapati | |
| 11,308,058 | B1 * | 4/2022 | Jiang | G06F 16/2264 |
| 11,386,060 | B1 * | 7/2022 | Schmitt | G06F 3/0652 |
| 11,829,394 | B2 * | 11/2023 | Jiang | G06F 16/215 |
| 2003/0204513 | A1 * | 10/2003 | Bumbulis | G06F 16/2246 |
| 2005/0171960 | A1 * | 8/2005 | Lomet | G06F 16/2308 |
| 2007/0078813 | A1 * | 4/2007 | Beavin | G06F 16/24557 |
| 2009/0238474 | A1 * | 9/2009 | Sandberg | G06F 16/3347 382/229 |
| 2010/0036864 | A1 | 2/2010 | Augenstein et al. | |
| 2010/0281013 | A1 * | 11/2010 | Graefe | G06F 16/2246 707/715 |
| 2010/0287143 | A1 * | 11/2010 | Di Carlo | G06F 16/284 707/693 |
| 2011/0035359 | A1 * | 2/2011 | Bendakovsky | G06F 11/1458 707/E17.007 |
| 2011/0264667 | A1 * | 10/2011 | Harizopoulos | G06F 16/221 707/E17.085 |
| 2014/0032593 | A1 * | 1/2014 | Libenzi | G06F 16/319 707/769 |
| 2014/0122455 | A1 * | 5/2014 | Leitner | G06F 16/951 707/706 |
| 2015/0032758 | A1 | 1/2015 | Schneider et al. | |
| 2015/0254272 | A1 * | 9/2015 | Regni | G06F 16/2379 707/694 |
| 2015/0261750 | A1 * | 9/2015 | Blaas | G06F 16/2237 707/747 |
| 2015/0347470 | A1 * | 12/2015 | Ma | G06F 16/2372 707/803 |
| 2016/0171071 | A1 * | 6/2016 | Beisiegel | G06F 16/2228 707/715 |
| 2016/0314162 | A1 * | 10/2016 | Tarta | G06F 16/273 |
| 2019/0179933 | A1 * | 6/2019 | Wang | G06F 16/2272 |
| 2020/0310644 | A1 * | 10/2020 | Hua | G06F 3/0644 |
| 2020/0311142 | A1 * | 10/2020 | Edelman | G06F 16/9027 |
| 2021/0218955 | A1 * | 7/2021 | Lee | H04N 19/159 |
| 2023/0195710 | A1 * | 6/2023 | Wang | G06F 16/2272 707/741 |

OTHER PUBLICATIONS

PCT International Search Report and Written Opinion, dated Sep. 26, 2022, regarding Application No. PCT/IB2022/055293, 9 pages.

* cited by examiner

INCREASING INDEX AVAILABILITY IN DATABASES

BACKGROUND

1. Field

The disclosure relates generally to database indices and more specifically to increasing index availability and system performance in a relational database when an index for the relational database is reorganized, dropped, or imported by logically dividing the index into a plurality of mini-indices and then consolidating the mini-indices while continuing to allow data update, delete, and insert operations corresponding to customer transactions on the table space of the relational database during consolidation of the mini-indices.

2. Description of the Related Art

A database is an organized collection of digital data, generally stored and accessed electronically by a computer. A relational database is a digital database based on a relational data model (e.g., a table comprised of columns and rows). A software component typically used to maintain relational databases is a relational database management system. Many relational database systems utilize Structured Query Language (SQL) for querying and maintaining the databases.

A database index is a data structure that improves the speed and efficiency of data operations on a database at the cost of additional writes and storage space to maintain the index data structure. Indices are used to quickly locate data without having to search every row in a database table every time a database table is accessed. Indices can be created using one or more columns of a database table, which provides the basis for both rapid lookups and efficient access of data records. Indices correspond to specific tables and consist of a set of keys. The keys are values in the index and are based on a table's columns.

A table space map is a database manager's internal representation of a table space that describes the logical to physical conversion of page locations in the table space. In a partitioned database, pages in the table space are logically numbered from 0 to (N−1), where N is the number of usable pages in the table space.

If no appropriate index exists for data lookup in a table space, then a table space scan is used instead of an index scan to locate the data. In other words, when no appropriate index exists, then all pages of the table space have to be scanned, which increases data lookup time and decreasing system performance. In addition, under certain circumstances, an index needs to be rebuilt, which takes a significant amount of time to complete, when, for example, a large table reorganization occurs, a large amount of data is imported, or a SQL drop index command is used to delete an index before an intensive data insert to avoid massive, synchronized input/output. As a result, SQL query performance will be negatively impacted when an index is unavailable due to index rebuild. For example, customer transactions will need to be suspended during the index rebuild process, which negatively impacts performance.

Some current solutions generate or modify a table space using a plurality of partitions to accelerate the entire index rebuilding process by parallelism within each partition. However, adding or altering a partition within an existing table space is time consuming and requires a large number of system resources decreasing system performance and index availability. In addition, index rebuilding against data within each partition also needs a lot of time and resources when the data scale is large.

SUMMARY

According to one illustrative embodiment, a computer-implemented method for increasing index search efficiency and availability in a database is provided. A computer builds an index space matrix corresponding to a plurality of mini-indices of the database using ordered boundary values that correspond to key value ranges of each respective mini-index to increase index search efficiency by removing redundant mini-index accesses. The computer consolidates mini-indices of the plurality of mini-indices asynchronously without suspending access to the mini-indices using a particular consolidation policy of a plurality of consolidation policies that corresponds to an amount of key value overlap identified between the mini-indices. The computer, using the index space matrix, performs data operations corresponding to transactions during consolidation of the mini-indices without suspending access to the mini-indices. According to other illustrative embodiments, a computer system and computer program product for increasing index search efficiency and availability in a database are provided.

As a result, the illustrative embodiments increasing index availability in the database by logically dividing the index into a plurality of mini-indices and then consolidating the mini-indices while continuing to allow data operations corresponding to transactions on the database during consolidation of the mini-indices thereby increasing system performance.

According to another illustrative embodiment, a method for increasing index search efficiency in a database is provided. Boundary values corresponding to key value ranges of respective mini-indices of a plurality of mini-indices of the database are identified. The boundary values corresponding to the key value ranges of each respective mini-index of the plurality of mini-indices are ordered in ascending order to form ordered boundary values. An index space matrix corresponding to the plurality of mini-indices of the database is built using the ordered boundary values that correspond to key value ranges of each respective mini-index to increase index search efficiency by removing redundant mini-index accesses. As a result, the illustrative embodiment increases index search efficiency in the database and, therefore, increases system performance.

The illustrative embodiments also optionally copy key values from a source mini-index to a target mini-index during consolidation of the mini-indices, mark copied key values from the source mini-index to the target mini-index with a future delete flag in the source mini-index and a hibernate flag in the target mini-index. In addition, the illustrative embodiments optionally perform existing transactions against the source mini-index and the target mini-index and then perform a drain action on the source mini-index to remove key values marked with the future delete flag from the source mini-index in response to the existing transactions against the source mini-index having been completed. Further, the illustrative embodiments optionally perform a wakeup action on key values marked with the hibernate flag in the target mini-index in response to performing the drain action on the source mini-index to implement an index switch without suspending mini-index access and perform new incoming transactions against the target mini-index in response to performing the wakeup action on the key values marked with the hibernate flag in the target mini-index. As a result, the illustrative embodiments enable continued data operations corresponding to transactions on the database during consolidation of the mini-indices of the database.

DETAILED DESCRIPTION

Figure 1:
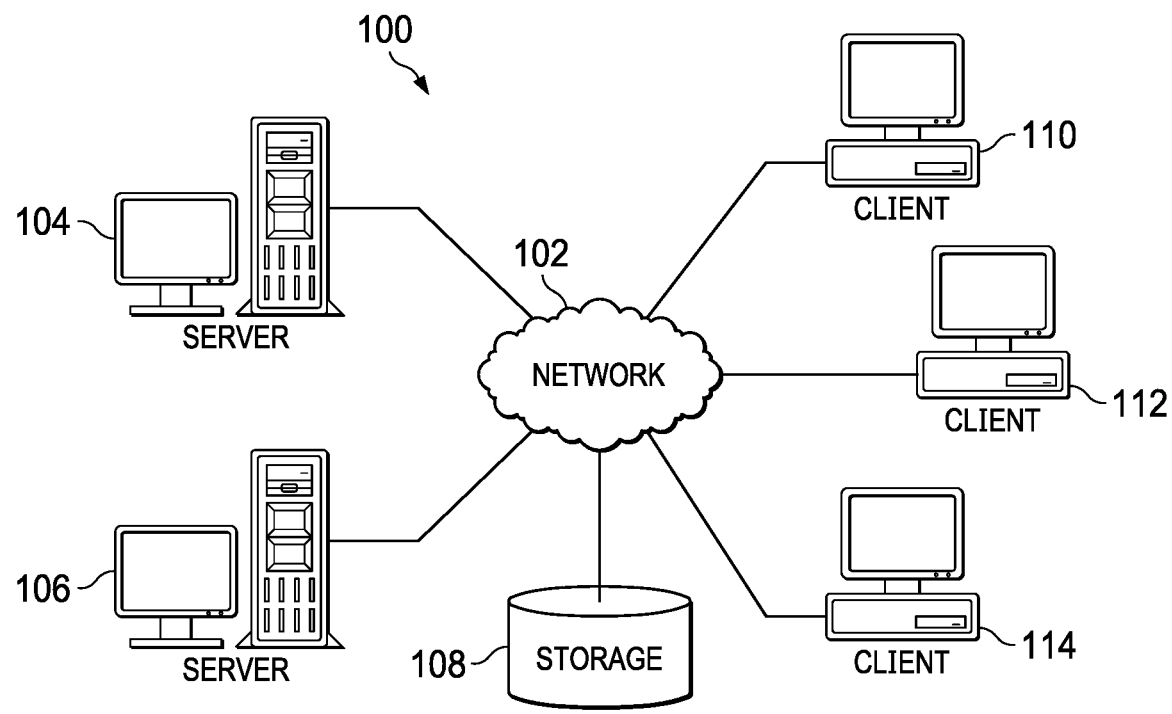
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
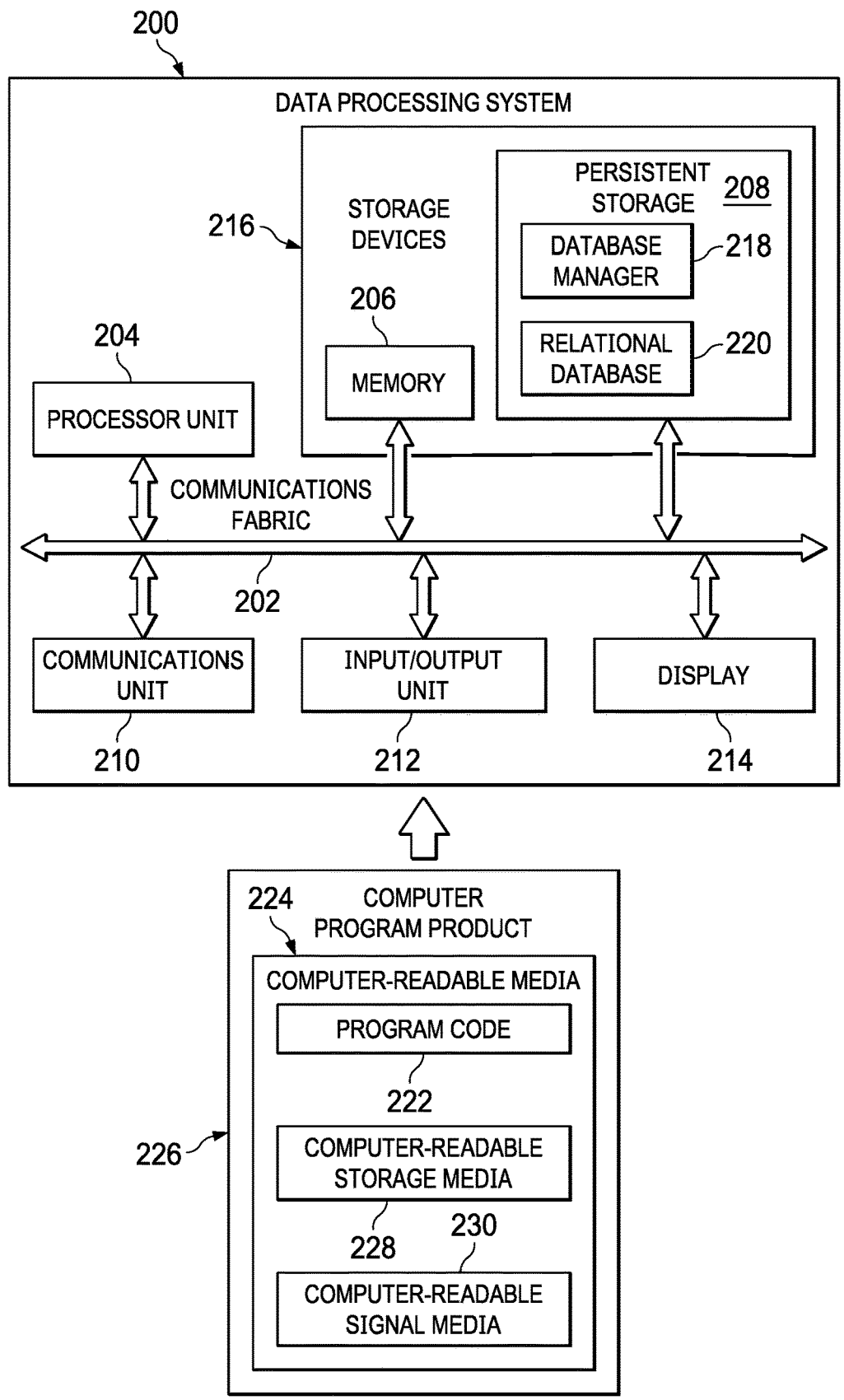
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 process and store customer entity transactions in a table space of a relational database. The customer entity may be, for example, an enterprise, company, business, organization, institution, agency, or the like. The table space is comprised of columns and rows that contain the customer entity transaction data. The transaction data may correspond to any type of transactions, such as, for example, banking transactions, financial transactions, healthcare transactions, insurance transactions, and the like. Further, server 104 and server 106 increase index availability of the relational database when an index for the relational database is reorganized, dropped, or imported by logically dividing the index into a plurality of mini-indices and then consolidating the mini-indices while continuing to allow data update, delete, and insert operations corresponding to the customer entity transactions on the table space of the relational database during consolidation of the mini-indices, thereby increasing system performance.

Also, it should be noted that server 104 and server 106 may each represent a cluster of servers in one or more data centers. Alternatively, server 104 and server 106 may each represent multiple computing nodes in one or more cloud environments. Furthermore, server 104 and server 106 may process and store transaction data for a plurality of different entities.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, gaming devices, kiosks, and the like, with wire or wireless communication links to network 102. Users of clients 110, 112, and 114 may utilize clients 110, 112, and 114 to perform transactions associated with customer entities corresponding to server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of servers, identifiers and network addresses for a plurality of client devices, identifiers for a plurality of different users, transaction data, and the like. Furthermore, storage 108 may store other types of data, such as authentication or credential data that may include usernames, passwords, and the like associated with client device users and system administrators, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the relational database management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores database manager 218. However, it should be noted that even though database manager 218 is illustrated as residing in persistent storage 208, in an alternative illustrative embodiment, database manager 218 may be a separate component of data processing system 200. For example, database manager 218 may be a hardware component coupled to communication fabric 202 or a combination of hardware and software components.

Database manager 218 controls the process of logically dividing an index corresponding to relational database 220 into a plurality of mini-indices and then consolidating the plurality of mini-indices while continuing to allow data operations (e.g., update, delete, insert, and the like) corresponding to customer transactions on a table space of relational database 220 during consolidation of the mini-indices to increase index lookup efficiency and availability. Database manager 218 may be, for example, a relational database management system. Relational database 220 stores customer entity transaction data in a set of tables, each comprised of columns and rows.

As a result, data processing system 200 operates as a special purpose computer system in which database manager 218 in data processing system 200 enables increased index availability and system performance during index rebuild. In particular, database manager 218 transforms data processing system 200 into a special purpose computer system as compared to currently available general computer systems that do not have database manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 222 is located in a functional form on computer-readable media 224 that is selectively removable and may be loaded onto or transferred to data processing system 200 for running by processor unit 204. Program code 222 and computer-readable media 224 form computer program product 226. In one example, computer-readable media 224 may be computer-readable storage media 228 or computer-readable signal media 230.

In these illustrative examples, computer-readable storage media 228 is a physical or tangible storage device used to store program code 222 rather than a medium that propagates or transmits program code 222. Computer-readable storage media 228 may include, for example, an optical or magnetic disc that is inserted or placed into a drive or other device that is part of persistent storage 208 for transfer onto a storage device, such as a hard drive, that is part of persistent storage 208. Computer-readable storage media 228 also may take the form of a persistent storage, such as a hard drive, a thumb drive, or a flash memory that is connected to data processing system 200.

Alternatively, program code 222 may be transferred to data processing system 200 using computer-readable signal media 230. Computer-readable signal media 230 may be, for example, a propagated data signal containing program code 222. For example, computer-readable signal media 230 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 224" can be singular or plural. For example, program code 222 can be located in computer-readable media 224 in the form of a single storage device or system. In another example, program code 222 can be located in computer-readable media 224 that is distributed in multiple data processing systems. In other words, some instructions in program code 222 can be located in one data processing system while other instructions in program code 222 can be located in one or more other data processing systems. For example, a portion of program code 222 can be located in computer-readable media 224 in a server computer while another portion of program code 222 can be located in computer-readable media 224 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 222.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

In relational database systems, an index is widely used for data accesses. An index is an efficient way to promote speed on query (e.g., SQL) execution. System performance decreases under certain circumstances such as when a table space scan is used instead of an index scan when no appropriate index exists for accessing the data. In other words, when no appropriate index exists, then all of the pages of the table space have to be scanned, increasing data lookup time and decreasing system performance. Often an index needs to be rebuilt, which takes a significant amount of time to complete, such as when a large table reorganization occurs, a large amount of data is imported, a SQL drop index command is used to delete an index before an intensive data insert to avoid massive, synchronized input/output, or the like. As a result, SQL performance will be negatively impacted when an index is unavailable due to an index rebuild process. For example, customer transactions will need to be suspended during the index rebuild process, which negatively impacts performance.

Current solutions generate or modify a relational database table space using an increased number of partitions to accelerate the entire index rebuilding process by parallelism within each partition. However, adding or altering a partition within an existing tablespace is time consuming and requires a large number of system resources decreasing system performance and index availability. In addition, index rebuilding against data within each partition also takes a lot of time and resources when the data scale is large.

Illustrative embodiments take into account and address system performance and index availability issues when an index for a large relational database is reorganized, dropped, or imported by illustrative embodiments logically dividing the index into a plurality of mini-indices and consolidating (e.g., combining, merging, aggregating, or the like) the plurality of mini-indices while continuing to allow data operations (e.g., data update, delete, insert, and the like) on the table space during consolidation of mini-indices. Illustrative embodiments build a plurality of mini-indexes against a simple table space or a partitioned table space of a relational database based on logical segments corresponding to table space map pages of the table space. In addition, illustrative embodiments build an index space matrix corresponding to the plurality of mini-indices by removing or pruning redundant mini-index accesses. Further, illustrative embodiments consolidate mini-indices asynchronously in the background without suspending mini-index access using a particular consolidation policy that corresponds to an amount of key value overlap between the mini-indices. Furthermore, illustrative embodiments maintain data consistency for data update, delete, and insert operations corresponding to customer entity (e.g., enterprise) transactions while performing consolidation of mini-indices. As a result, illustrative embodiments increase system performance and index availability during index rebuild.

Thus, illustrative embodiments provide one or more technical solutions that overcome a technical problem associated with system downtime caused by index rebuild. As a result, these one or more technical solutions provide a technical effect and practical application in the field of relational databases by increasing index availability and system performance during index rebuild.

Figure 3:
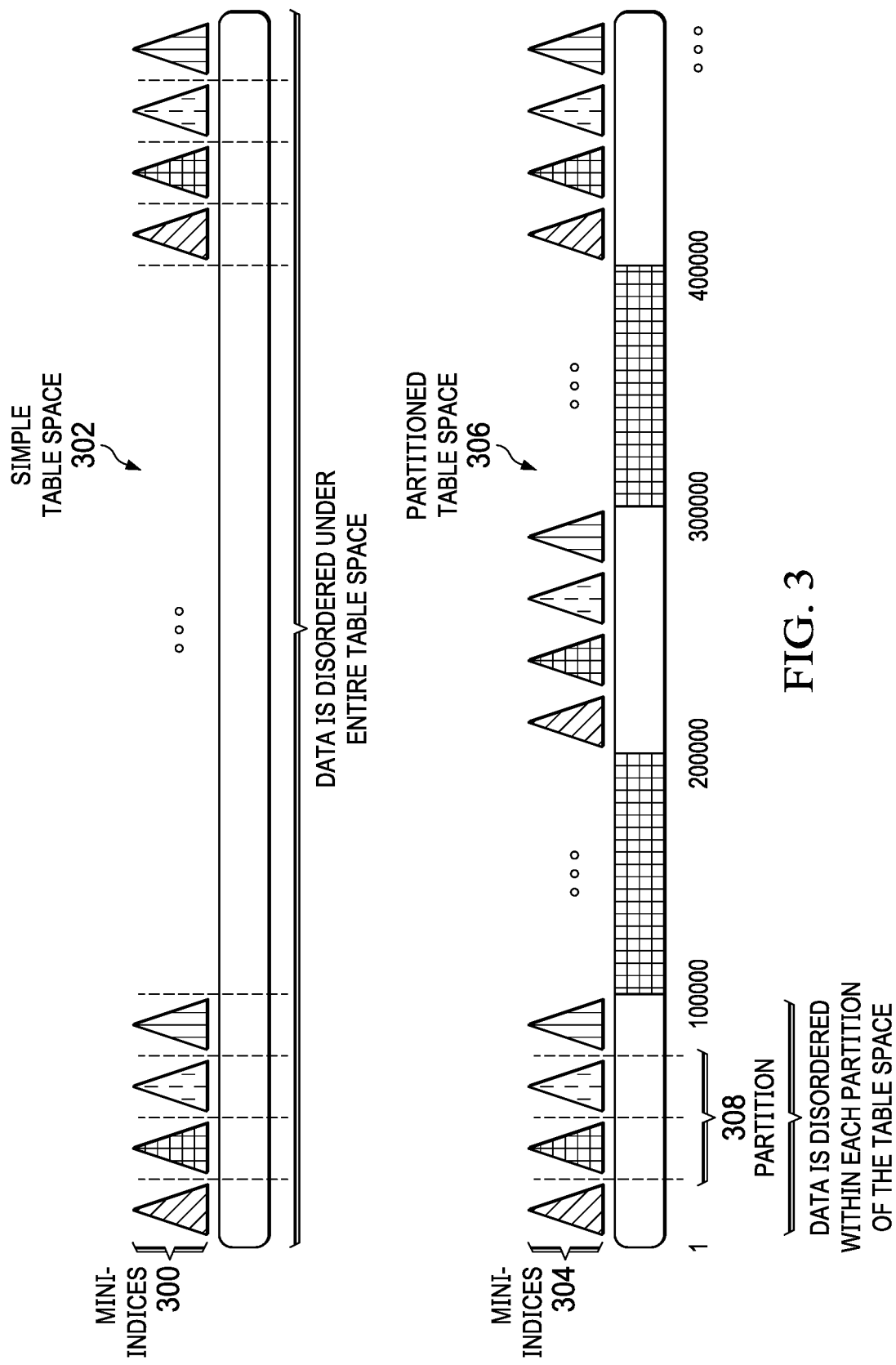
FIG. 3 is a diagram illustrating mini-indices corresponding to a table space of a relational database in accordance with an illustrative embodiment.

With reference now to FIG. 3, a diagram illustrating an example of mini-indices corresponding to a table space of a relational database is depicted in accordance with an illustrative embodiment. Mini-indices 300 correspond to simple table space 302 and mini-indices 304 correspond to partitioned table space 306. Simple table space 302 or partitioned table space 306 may be implemented in a relational database, such as, for example, relational database 220 in FIG. 2. A database manager, such as, for example, database manager 218 in FIG. 2, can perform processes of illustrative embodiments on either simple table space 302 or partitioned table space 306.

It should be noted that the transaction data stored in simple table space 302 is totally disordered under the entire table space. Similarly, the transaction data stored in partitioned table space 306 is disordered within each respective partition, such as partition 308, of the entire partitioned table space.

In this example, each respective mini-index of mini-indices 300 and mini-indices 304 is represented by a triangle shape. The database manager builds each respective mini-index, which corresponds to a given logical segment of the table space, in parallel. Each logical segment corresponds to a table space map page of the table space.

Figure 4:
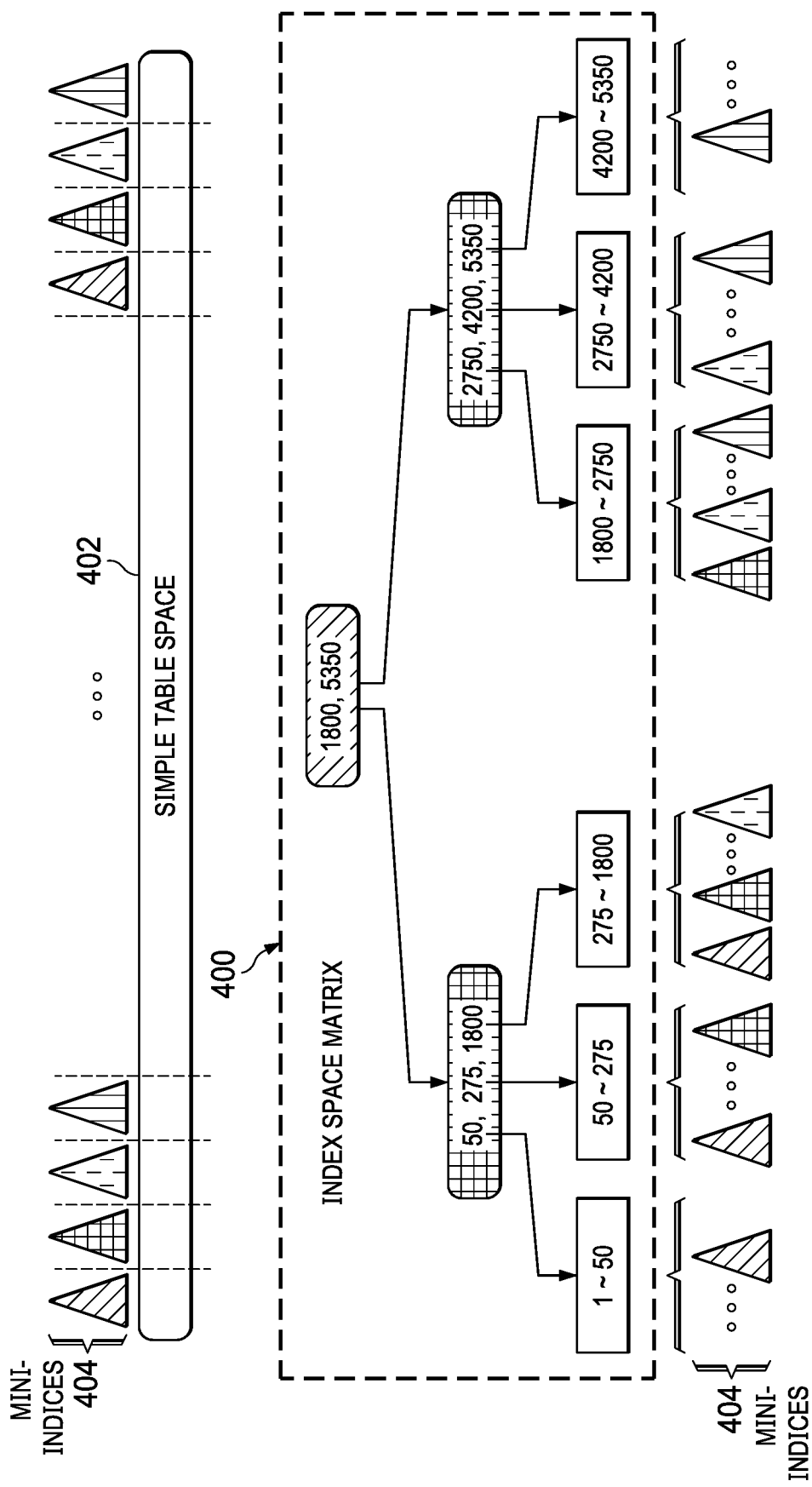
FIG. 4 is a diagram illustrating an example of an index space matrix corresponding to mini-indices of a table space in accordance with an illustrative embodiment.

With reference now to FIG. 4, a diagram illustrating an example of an index space matrix corresponding to mini-indices of a table space is depicted in accordance with an illustrative embodiment. In this example, index space matrix 400 corresponds to simple table space 402, such as, for example, simple table space 302 in FIG. 3. However, it should be noted that index space matrix 400 can correspond to a partitioned table space, such as, for example, partitioned table space 306 in FIG. 3, as well.

Mini-indices 404 correspond to simple table space 402 and represent a plurality of mini-indices. Mini-indices 404 may be, for example, mini-indices 300 in FIG. 3. A database manager, such as, for example, database manager 218 in FIG. 2, utilizes mini-indices 404 to efficiently locate and perform data operations on transaction data stored in simple table space 402 during index rebuild. Index space matrix 400 is an index of mini-indices 404. The database manager builds index space matrix 400 to optimize index search efficiency by pruning redundant key value accesses across mini-indices 404.

Figure 5:
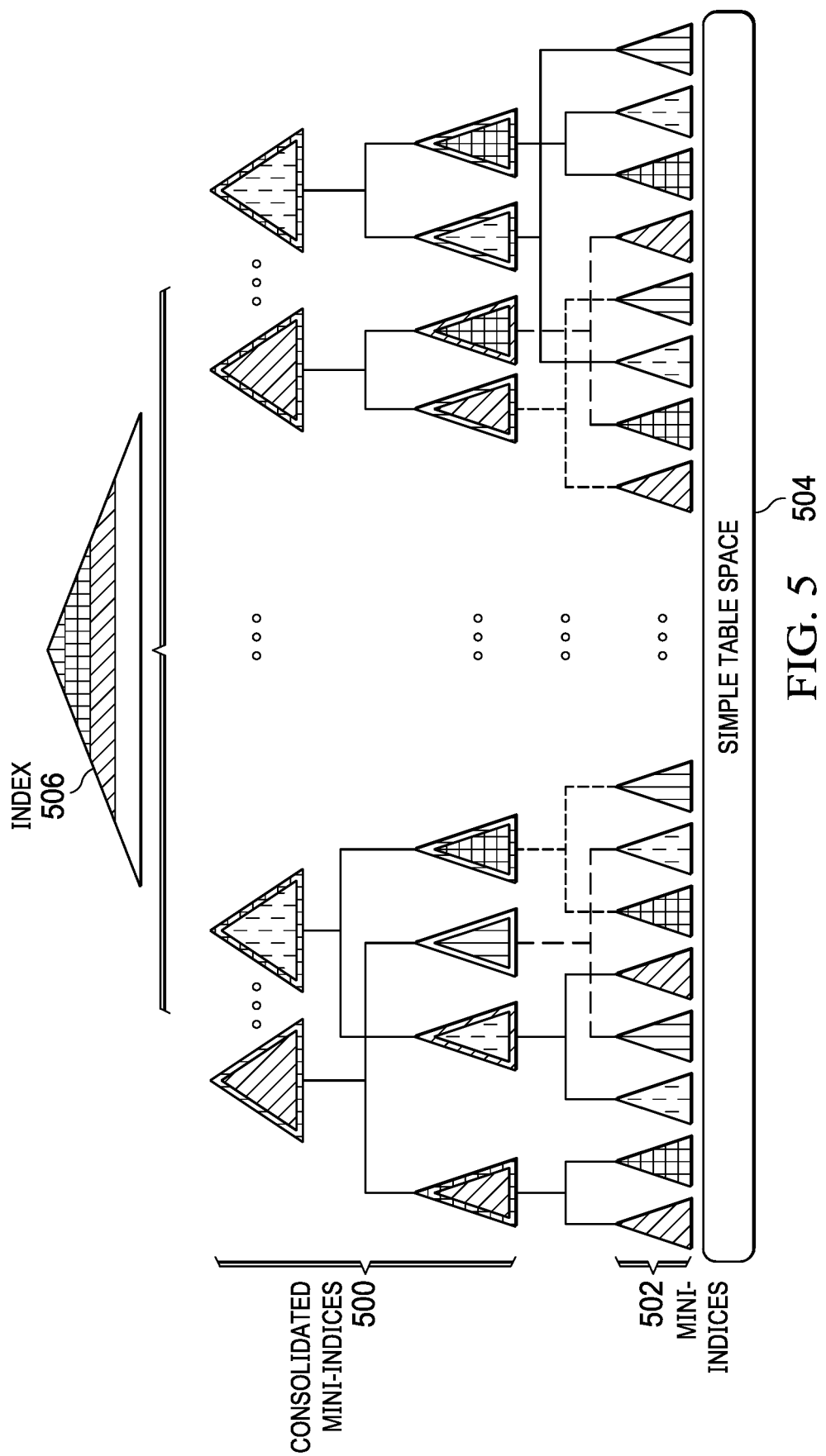
FIG. 5 is a diagram illustrating an example of consolidated mini-indices in accordance with an illustrative embodiment.

With reference now to FIG. 5, a diagram illustrating an example of consolidated mini-indices is depicted in accordance with an illustrative embodiment. In this example, each of consolidated mini-indices 500 represents a merging or combining of two mini-indices from mini-indices 502, which correspond to simple table space 504. Mini-indices 502 and simple table space 504 may be, for example, mini-indices 404 and simple table space 402 in FIG. 4.

In addition, this example shows only two levels of mini-index consolidation. However, it should be noted that a database manager, such as, for example, database manager 218 in FIG. 2, may continue to consolidate mini-indices at any number of different levels to finally generate index 506. Index 506 represents a final index after mini-index consolidation processes of illustrative embodiments have completed.

The database manager of illustrative embodiments consolidates mini-indices asynchronously in the background without suspending accesses to the mini-indices using a particular consolidation policy that corresponds to an amount of identified key value overlap between the mini-indices being consolidated. Also, it should be noted that as the database manager consolidates more mini-indices, system performance will increase because the database manager has fewer mini-indices to scan.

Figure 6:
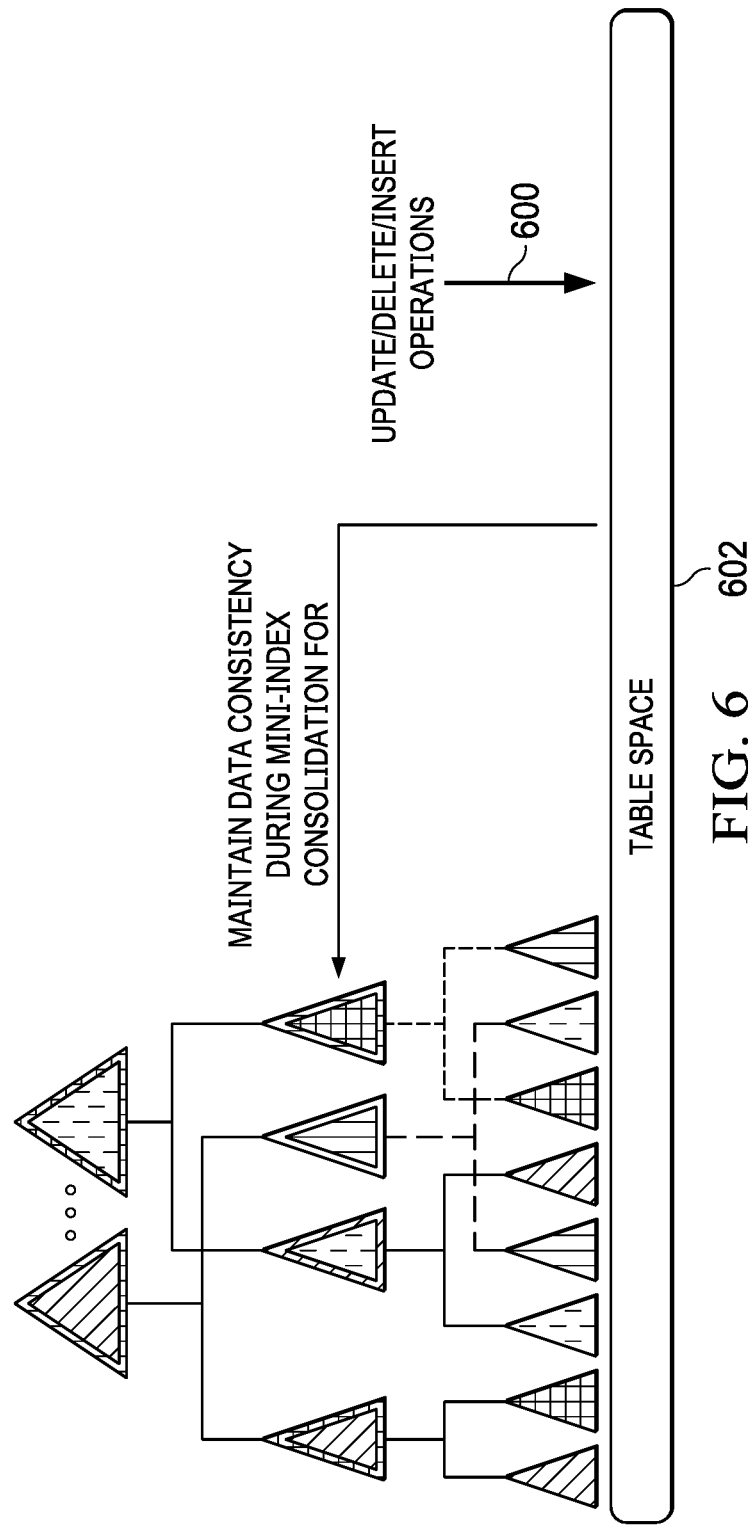
FIG. 6 is a diagram illustrating an example of update, delete, and insert operations on a table space in accordance with an illustrative embodiment.

With reference now to FIG. 6, a diagram illustrating an example of update, delete, and insert operations on a table space is depicted in accordance with an illustrative embodiment. Update, delete, and insert operations 600 may be implemented by a database manager, such as, for example, database manager 218 in FIG. 2. Update, delete, and insert operations 600 correspond to customer entity (e.g., enterprise) transactions stored in simple table space 602. The database manager maintains transaction data consistency during mini-index consolidation for update, delete, and insert operations 600 by using consolidation policies of illustrative embodiments.

Figure 7:
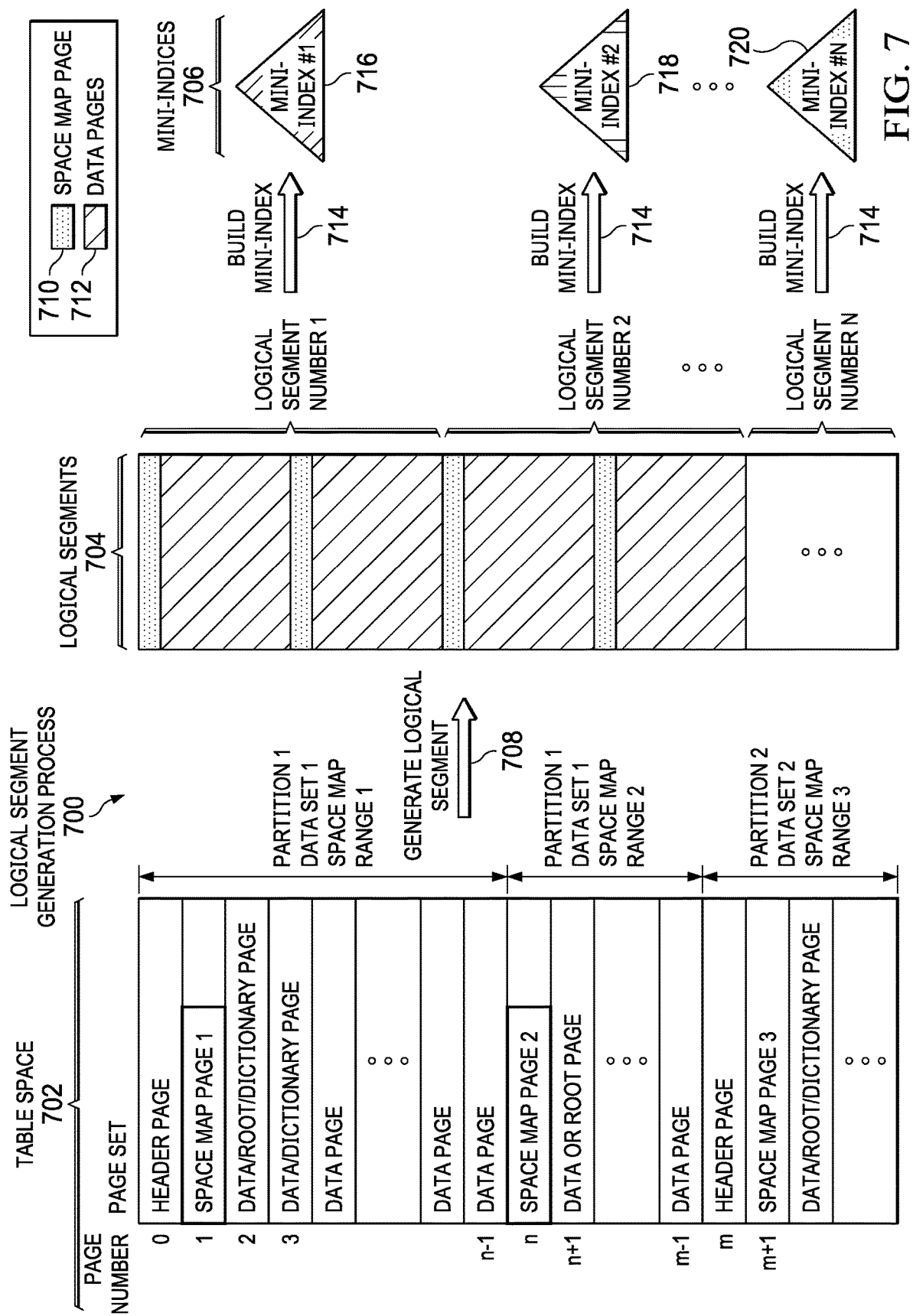
FIG. 7 is a diagram illustrating an example of a logical segment generation process in accordance with an illustrative embodiment.

With reference now to FIG. 7, a diagram illustrating an example of a logical segment generation process is depicted in accordance with an illustrative embodiment. Logical segment generation process 700 may be implemented by a database manager, such as, for example, database manager 218 in FIG. 2. Logical segment generation process 700 includes table space 702, logical segments 704, and mini-indices 706. Table space 702 corresponds to a relational database, such as, for example, relational database 220 in FIG. 2, and may be, for example, simple table space 602 in FIG. 6. In addition, table space 702 is comprised of a plurality of pages, such as, for example, header pages, table space map pages, data pages, and the like. The table space map pages organize and manage the data pages. One table space map page corresponds to a plurality of data pages.

At 708, the database manager generates logical segments 704 based on the table space map pages of table space 702.

The database manager manages a transaction dataset by utilizing the table space map pages. Logical segments 704 include a plurality of logical segments such as logical segment #1, logical segment #2, to logical segment #N, where in this example "N" represents any whole number greater than 2. Each respective logical segment includes one table space map page 710 and a plurality of data pages 712.

At 714, after generating logical segments 704, the database manager builds mini-indices 706 in parallel based on logical segments 704. In other words, the database manager builds in parallel a mini-index for each respective logical segment of logical segments 704. For example, the database manager builds mini-index #1 716 for logical segment #1, mini-index #2 718 for logical segment #2, to mini-index #N 720 for logical segment #N in parallel.

Figure 8:
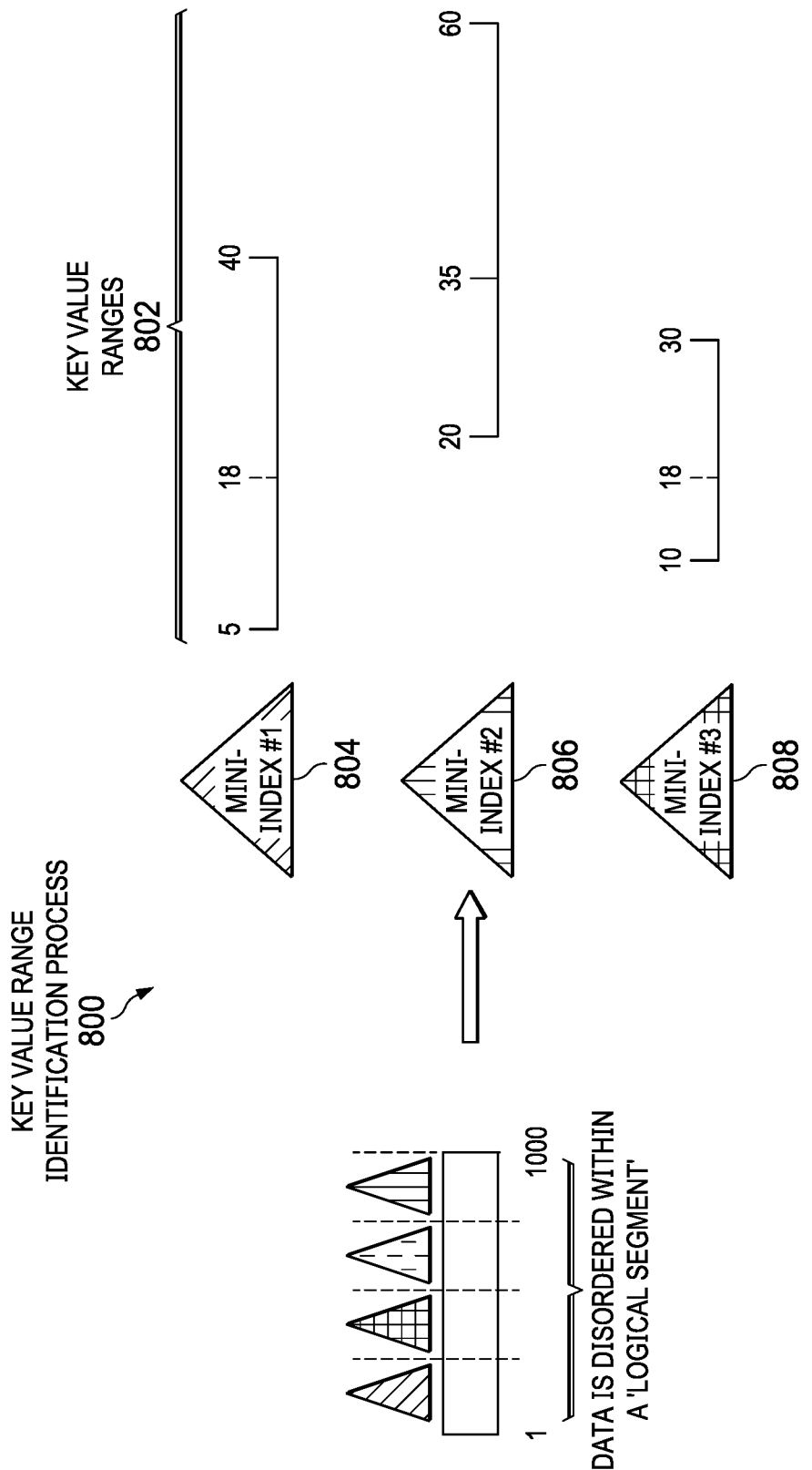
FIG. 8 is a diagram illustrating an example of a key value range identification process in accordance with an illustrative embodiment.

With reference now to FIG. 8, a diagram illustrating an example of a key value range identification process is depicted in accordance with an illustrative embodiment. Key value range identification process 800 may be implemented by a database manager, such as, for example, database manager 218 in FIG. 2. Key value range identification process 800 includes key value ranges 802, mini-index #1 804, mini-index #2 806, and mini-index #3 808. However, key value range identification process 800 is meant as an example only and not as a limitation of illustrative embodiments. In other words, key value range identification process 800 can include, for example, any number of mini-indices.

It should be noted that transaction data is disordered within each logical segment of the table space and each logical segment corresponds to a mini-index, such as mini-index #1 804, mini-index #2 806, and mini-index #3 808. The database manager identifies key value ranges 802 for each of mini-index #1 804, mini-index #2 806, and mini-index #3 808. Key value ranges 802 represent the range or span of key values corresponding to each of mini-index #1 804, mini-index #2 806, and mini-index #3 808. In this example, the database manager identifies the key value range for mini-index #1 804 as 5 to 40, the key value range for mini-index #2 806 as 20 to 60, and the key value range for mini-index #3 808 as 10 to 30. Thus, key value overlap exists between mini-index #1 804, mini-index #2 806, and mini-index #3 808.

Figure 9:
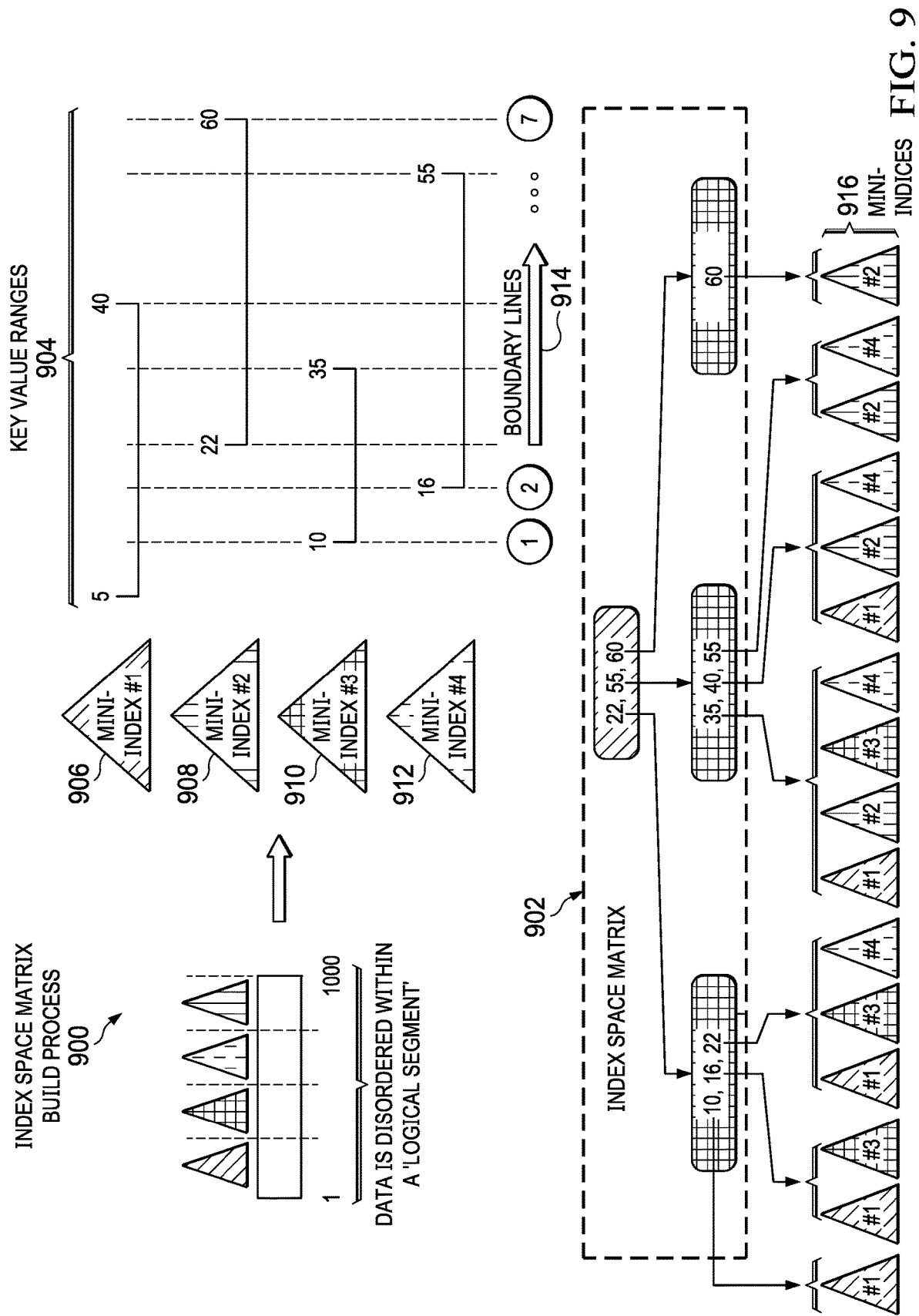
FIG. 9 is a diagram illustrating an example of an index space matrix build process in accordance with an illustrative embodiment.

With reference now to FIG. 9, a diagram illustrating an example of an index space matrix build process is depicted in accordance with an illustrative embodiment. Index space matrix build process 900 may be implemented by a database manager, such as, for example, database manager 218 in FIG. 2. Index space matrix build process 900 includes index space matrix 902, key value ranges 904, mini-index #1 906, mini-index #2 908, mini-index #3 910, and mini-index #4 912. However, it should be noted that index space matrix build process 900 is intended as an example only and may include, for example, any number of mini-indices.

The database manager identifies key value ranges 904 for mini-index #1 906, mini-index #2 908, mini-index #3 910, and mini-index #4 912. After identifying key value ranges 904, the database manager determines the boundary key values corresponding to boundary lines 914. In this example, boundary lines 914 include 7 boundary lines and the boundary key values corresponding to each of boundary lines 914 are 10, 16, 22, 35, 40, 55, and 60, respectively. Further, the database manager orders the boundary key values corresponding to boundary lines 914 of key value ranges 904 of respective mini-indices in ascending order to form ordered boundary values.

The database manager builds index space matrix 902 based on the ordered boundary key values of 10, 16, 22, 35, 40, 55, and 60, which corresponds to mini-index #1 906, mini-index #2 908, mini-index #3 910, and mini-index #4 912, to increase index search efficiency by pruning redundant index access. The database manager then associates each of the boundary key values of 10, 16, 22, 35, 40, 55, and 60 with a set of mini-indices within mini-indices 916. For example, boundary key value 10 corresponds to mini-index #1, boundary key value 16 corresponds to mini-index #1 and mini-index #3, boundary key value 22 corresponds to mini-index #1, mini-index #3, and mini-index #4, and so on. It should be noted that mini-index #1 906, mini-index #2 908, mini-index #3 910, and mini-index #4 912 comprise the corresponding mini-indices #1, #2, #3, and #4 of mini-indices 916.

Figure 10:
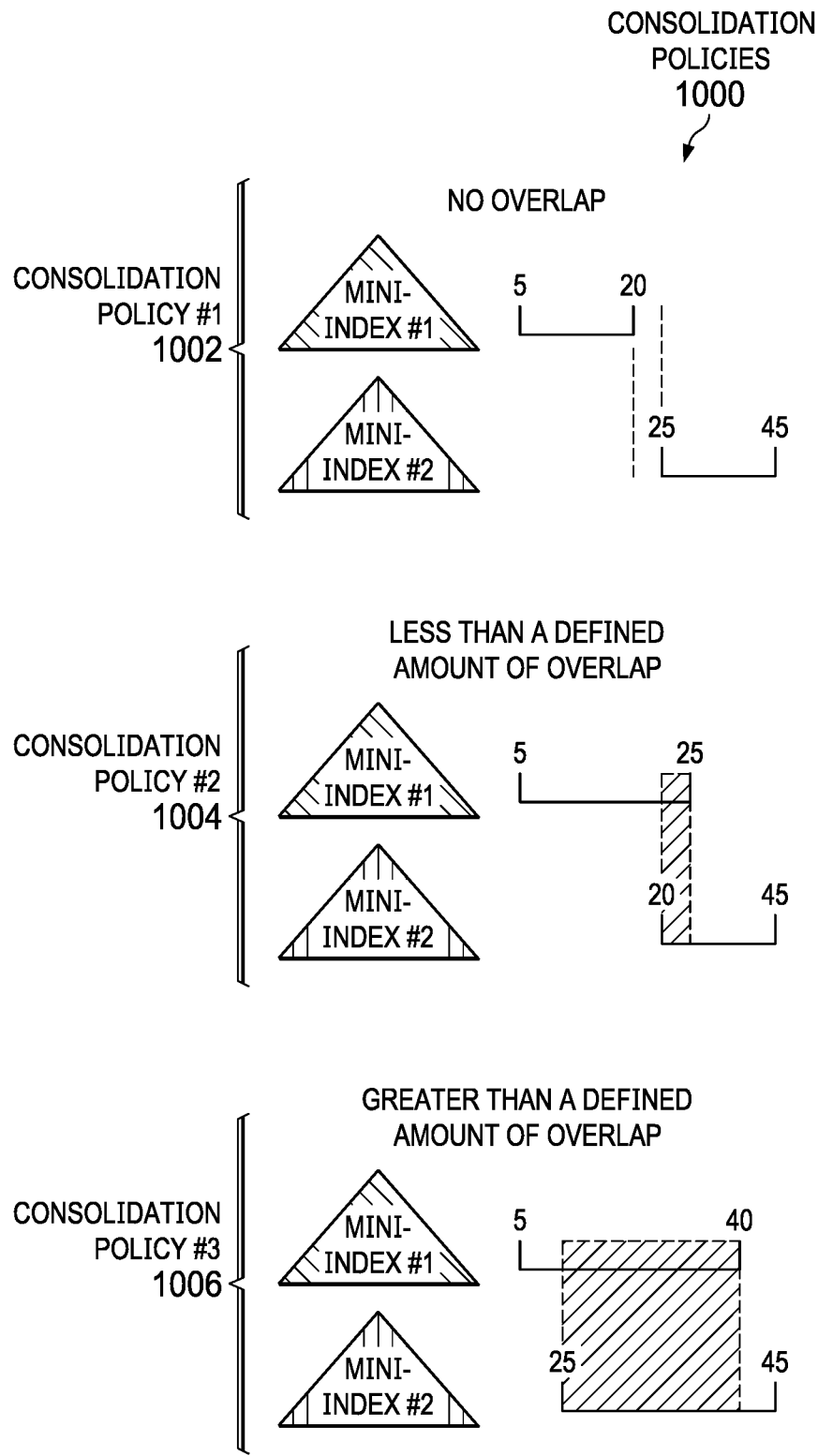
FIG. 10 is a diagram illustrating an example of consolidation policies in accordance with an illustrative embodiment.

With reference now to FIG. 10, a diagram illustrating an example of consolidation policies is depicted in accordance with an illustrative embodiment. Consolidation policies 1000 may be implemented by a database manager, such as, for example, database manager 218 in FIG. 2. In this example, consolidation policies 1000 includes consolidation policy #1 1002, consolidation policy #2 1004, and consolidation policy #3 1006.

The database manager consolidates two mini-indices, such as, for example, mini-index #1 and mini-index #2, asynchronously in a background without suspending access to the mini-indices using a particular consolidation policy of consolidation policies 1000 based on an identified amount of key value overlap between the mini-indices. For example, the database manager utilizes consolidation policy #1 1002 when no key value overlap exists between the two mini-indices, utilizes consolidation policy #2 1004 when the identified amount of key value overlap is less than a defined amount of key value overlap, and utilizes consolidation policy #3 1006 when the identified amount of key value overlap is greater than or equal to the defined amount of key value overlap. The defined amount of key value overlap may be, for example, 15%.

As shown in the example of consolidation policy #1 1002, mini-index #1 and mini-index #2 are identified as not having overlapping key values. As a result, the database manager consolidates mini-index #1 and mini-index #2 directly. As shown in the example of consolidation policy #2 1004, mini-index #1 and mini-index #2 are identified as having an amount of key value overlap less than the predefined amount of key value overlap (e.g., less than 15% key value overlap). As a result, the database manager transforms mini-index #1 and mini-index #2 so that key value overlap no longer exists between mini-index #1 and mini-index #2 and then consolidates transformed mini-index #1 and mini-index #2 according to consolidation policy #1 1002. As shown in the example of consolidation policy #3 1006, mini-index #1 and mini-index #2 are identified as having an amount of key value overlap greater than or equal to the predefined amount of key value overlap (e.g., greater than or equal to 15% key value overlap). As a result, the database manager builds a new mini-index from mini-index #1 and mini-index #2 because consolidating the two mini-indices would require too much time and too many system resources due to the amount of key value overlap.

Further, it should be noted that the database manager starts by finding all mini-indices with no overlapping key values and then consolidates those mini-indices. Afterward, the database manager consolidates those mini-indices having an identified amount of key value overlap less than the predefined amount of key value overlap. Finally, the database manager builds a new mini-index from those mini-indices having an identified amount of key value overlap greater than or equal to the predefined amount of key value overlap.

Figure 11A:
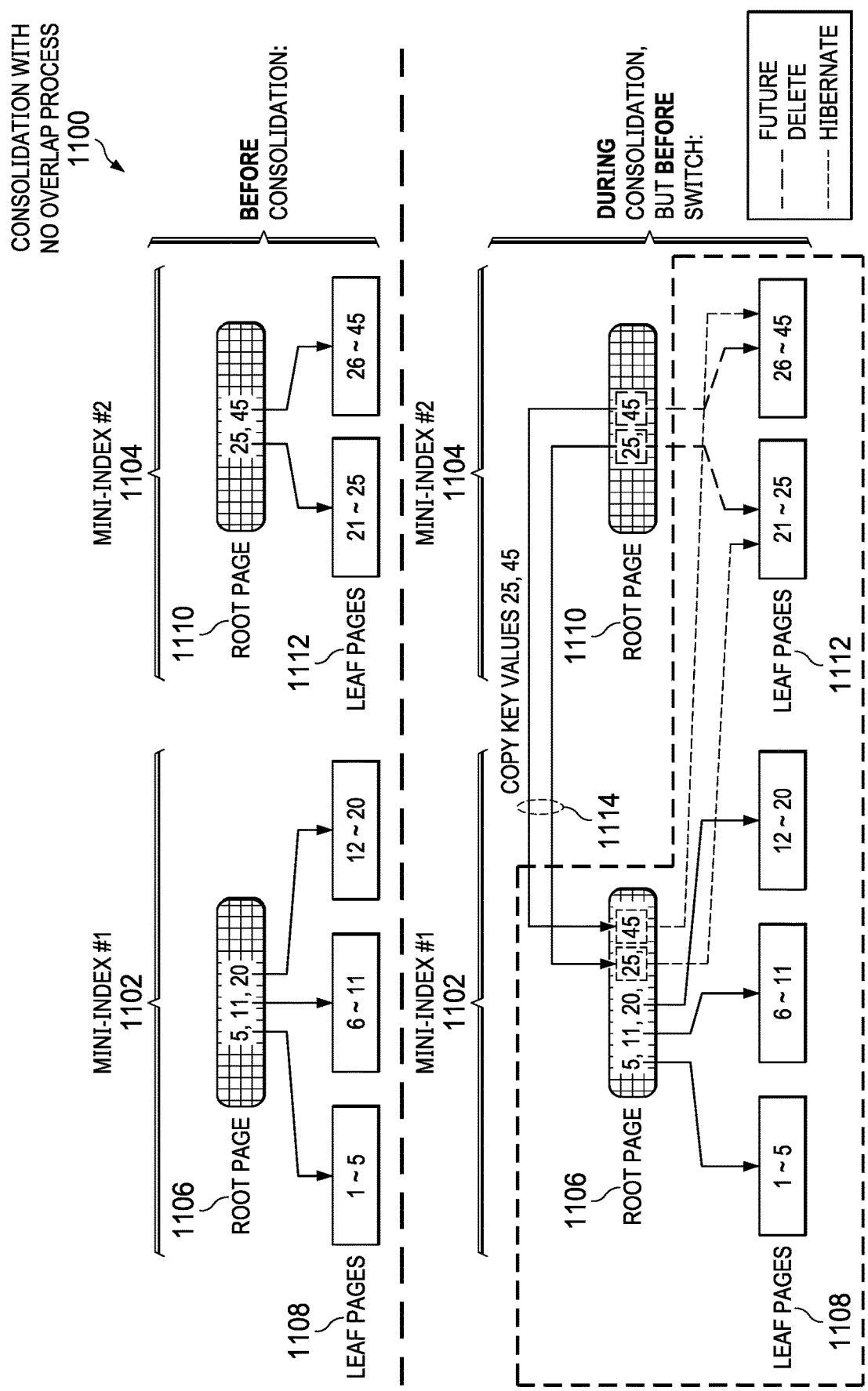
FIG. 11A is a diagram illustrating an example of a consolidation with no overlap process in accordance with an illustrative embodiment.

With reference now to FIG. 11A, a diagram illustrating an example of a consolidation with no overlap process is depicted in accordance with an illustrative embodiment. Consolidation with no overlap process 1100 may be implemented by a database manager, such as, for example, database manager 218 in FIG. 2, according to a first consolidation policy, such as, for example, consolidation policy #1 1002 in FIG. 10. In this example, consolidation with no overlap process 1100 includes mini-index #1 1102 and mini-index #2 1104, which have no identified overlapping key values. Mini-index #1 1102 includes root page 1106 and leaf pages 1108. Mini-index #2 1104 includes root page 1110 and leaf pages 1112.

Before consolidation, root page 1106 contains key values 5, 11, and 20. Leaf pages 1108 contain key values 1 to 5, 6 to 11, and 12 to 20. Root page 1110 contains key values 25 and 45. Leaf pages 1112 contain key values 21 to 25 and 26 to 45.

During consolidation, but before performing a switch action, at 1114, the database manager copies key values 25 and 45 from root page 1110 to root page 1106. In addition, the database manager marks key values 25 and 45 in root page 1110 with a future delete flag. Further, the data base manager marks key values 25 and 45 in root page 1106 with a hibernate flag. In other words, key values 25 and 45 are not currently visible in root page 1106 because of the hibernate flag.

Figure 11B:
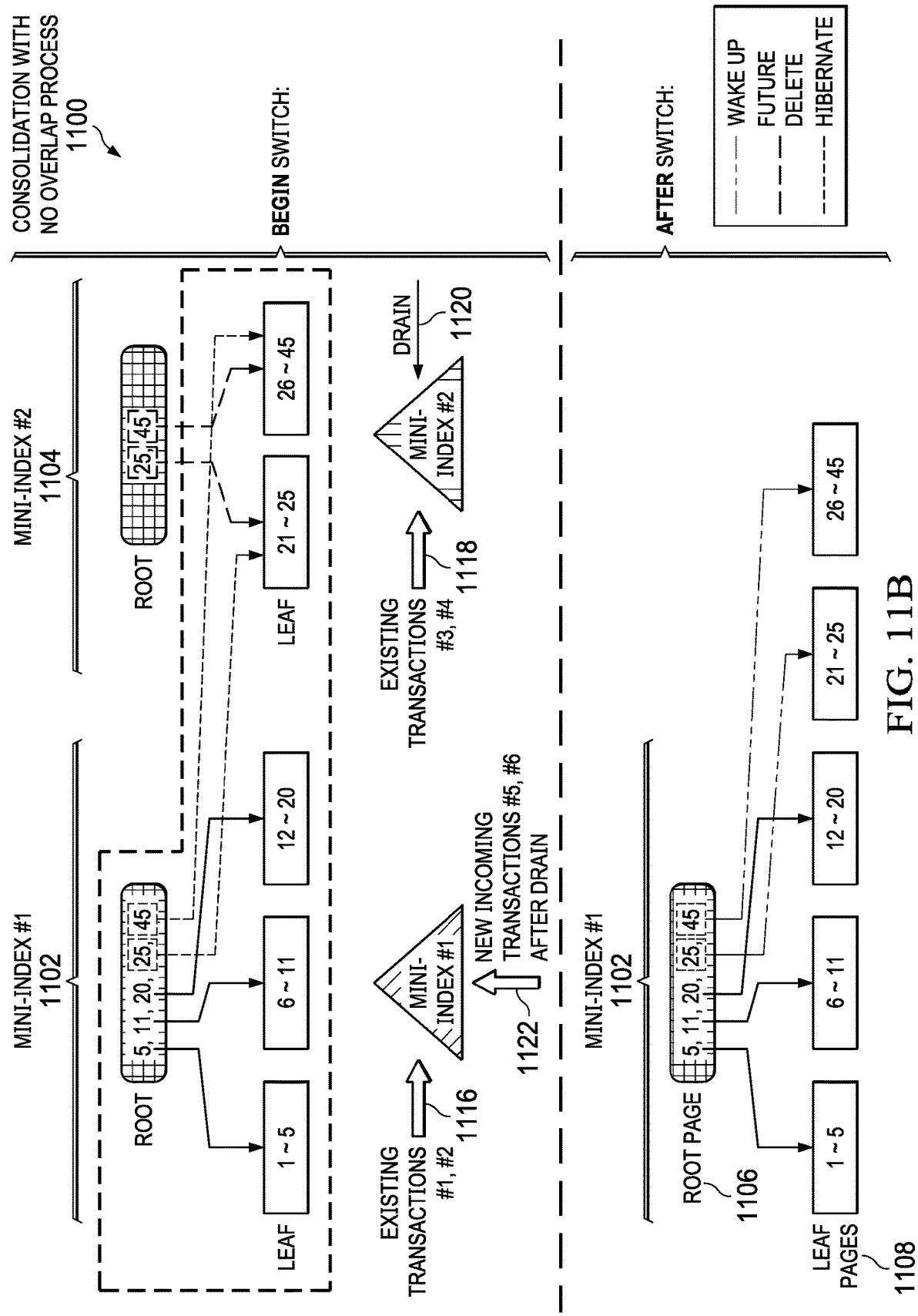
FIG. 11B is a diagram illustrating a continuation of the consolidation with no overlap process shown in FIG. 11A in accordance with an illustrative embodiment.

With reference now to FIG. 11B, a diagram illustrating a continuation of the consolidation with no overlap process shown in FIG. 11A is depicted in accordance with an illustrative embodiment. To avoid any transaction suspension, the database manager first performs a drain action on the source mini-index (i.e., mini-index #2 1104) and then performs the switch action on the target mini-index (i.e., mini-index #1 1102) when all previously existing transactions are performed against mini-index #2 1104.

For example, at 1116, the database manager performs existing transactions #1 and #2 against mini-index #1 1102 and, at 1118, the database manager performs existing transactions #3 and #4 against mini-index #2 1104. Existing transactions #1, #2, #3, and #4 were received during the consolidation process, but prior to the draining and switching actions. After the database manager completes existing transactions #3 and #4 against mini-index #2 1104, the database manager performs a drain action on mini-index #2 1104 at 1120. The database manager performs the drain action by, for example, deleting key values 25 and 45 copied from mini-index #2 1104 to mini-index #1 1102 in preparation of switching to mini-index #1 1102. In addition, the database manager removes the hibernate flag from key values 25 and 45 on mini-index #1 1102 after completing the drain action on mini-index #2 1104. It should be noted that the database manager utilizes a timestamp of when the hibernate flag was removed to determine visibility of key values 25 and 45 on mini-index #1 1102 (i.e., wakeup of key values 25 and 45 on mini-index #1 1102 after drain is completed on mini-index #2 1104). Now, at 1122, the database manager performs new incoming transactions #5 and #6 on mini-index #1 1102 after drain is completed on mini-index #2 1104. In other words, in response to the drain action being completed on mini-index #2 1104, the database manager performs all new incoming transactions against mini-index #1 1102. After the database manager completes the switch action to mini-index #1 1102, root page 1106 contains key values 5, 11, 20, 25, and 45 and leaf pages 1108 contain key values 1 to 5, 6 to 11, 12 to 20, 21 to 25, and 26 to 45.

Figure 12A:
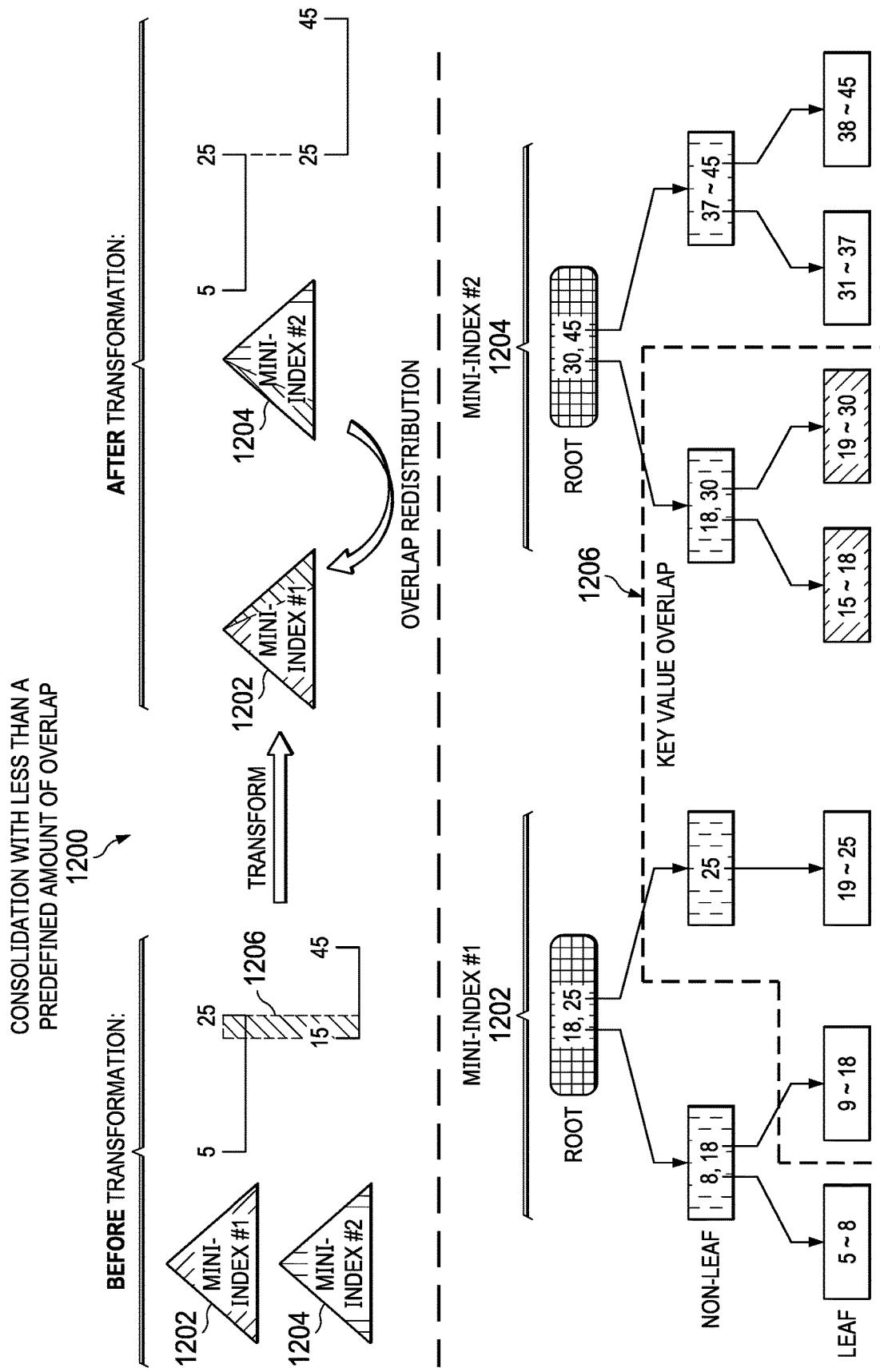
FIG. 12A is a diagram illustrating an example of a consolidation with less than a predefined amount of overlap process in accordance with an illustrative embodiment.

With reference now to FIG. 12A, a diagram illustrating an example of a consolidation with less than a predefined amount of overlap process is depicted in accordance with an illustrative embodiment. Consolidation with less than a predefined amount of overlap process 1200 may be implemented by a database manager, such as, for example, database manager 218 in FIG. 2, according to a second consolidation policy, such as, for example, consolidation policy #2 1004 in FIG. 10. In this example, consolidation with less than a predefined amount of overlap process 1200 includes mini-index #1 1202 and mini-index #2 1204. Key value overlap 1206 exists between mini-index #1 1202 and mini-index #2 1204 from key value 15 to key value 25. Key value overlap 1206 is less than the defined amount of key value overlap (e.g., 15%). Because key value overlap 1206 is less than the defined amount of key value overlap, the database manager redistributes the key value overlap of leaf pages from mini-index #2 1204 to mini-index #1 1202 so that the key value overlap no longer exists between mini-index #1 1202 and mini-index #2 1204. Afterward, the database manager consolidates mini-index #1 1202 and mini-index #2 1204.

Figure 12B:
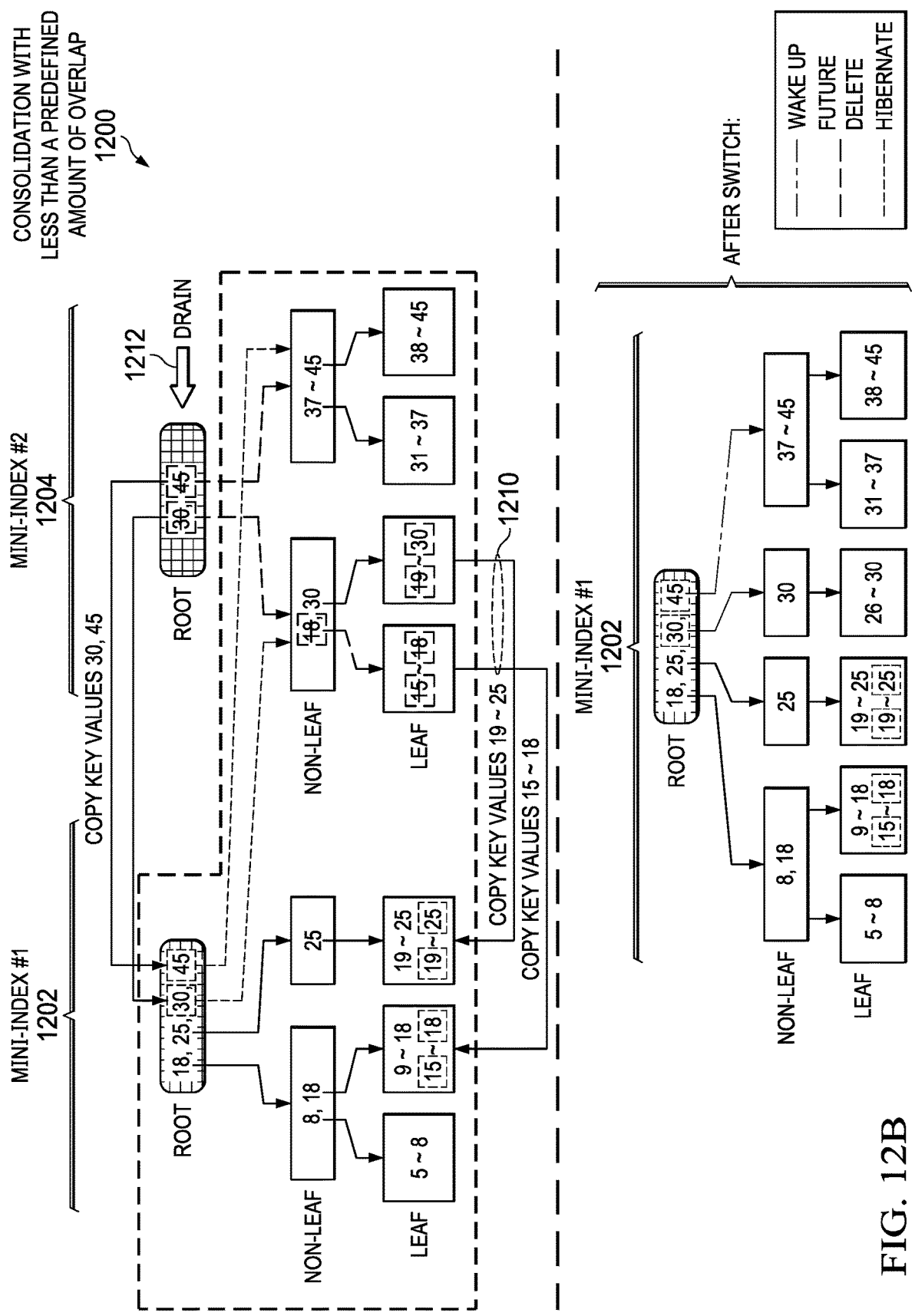
FIG. 12B is a diagram illustrating a continuation of the consolidation with less than the predefined amount of overlap process shown in FIG. 12A in accordance with an illustrative embodiment.

With reference now to FIG. 12B, a diagram illustrating a continuation of the consolidation with less than the predefined amount of overlap process shown in FIG. 12A is depicted in accordance with an illustrative embodiment. At 1208, the database manager copies key values 30 and 45 from the root page of mini-index #2 1204 to the root page of mini-index #1 1202. In addition, at 1210, the database manager copies key values 15 to 18 and key values 19 to 25 from leaf pages of mini-index #2 1204 to leaf pages of mini-index #1 1202. In response to performing all existing transactions against mini-index #2 1204, the database manager, at 1212, performs a drain action on mini-index #2 1204 to remove key values marked with a future delete flag from pages of mini-index #2 1204. In response to performing the drain action on mini-index #2 1204, the database manager wakes up hibernated key values on pages of mini-index #1 1202 and performs a switch action to perform all new incoming transactions against mini-index #1 1202.

Figure 13A:
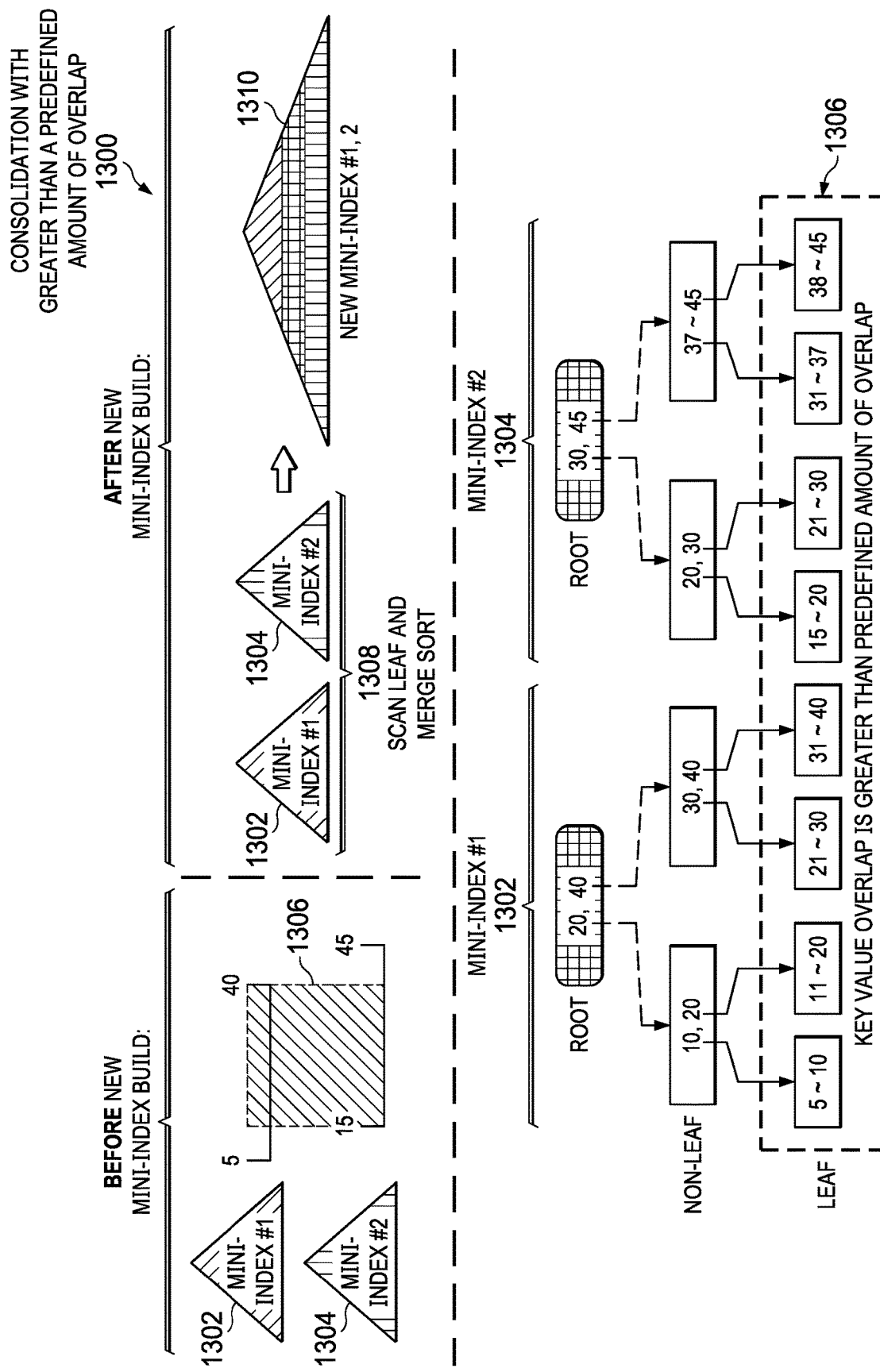
FIG. 13A is a diagram illustrating an example of a consolidation with greater than the predefined amount of overlap process in accordance with an illustrative embodiment.

With reference now to FIG. 13A, a diagram illustrating an example of a consolidation with greater than the predefined amount of overlap process is depicted in accordance with an illustrative embodiment. Consolidation with greater than a predefined amount of overlap process 1300 may be implemented by a database manager, such as, for example, database manager 218 in FIG. 2, according to a third consolidation policy, such as, for example, consolidation policy #3 1006 in FIG. 10. In this example, consolidation with greater than a predefined amount of overlap process 1300 includes mini-index #1 1302 and mini-index #2 1304. Key value overlap 1306 exists between mini-index #1 1302 and mini-index #2 1304 from key value 15 to key value 40. Key value overlap 1306 is greater than or equal to the defined amount of key value overlap (e.g., 15%). Because key value overlap 1306 is greater than or equal to the defined amount of key value overlap, at 1308, the database manager performs a scan leaf and merge sort process to build new mini-index #1, 2 1310 from mini-index #1 1302 and mini-index #2 1304.

Figure 13B:
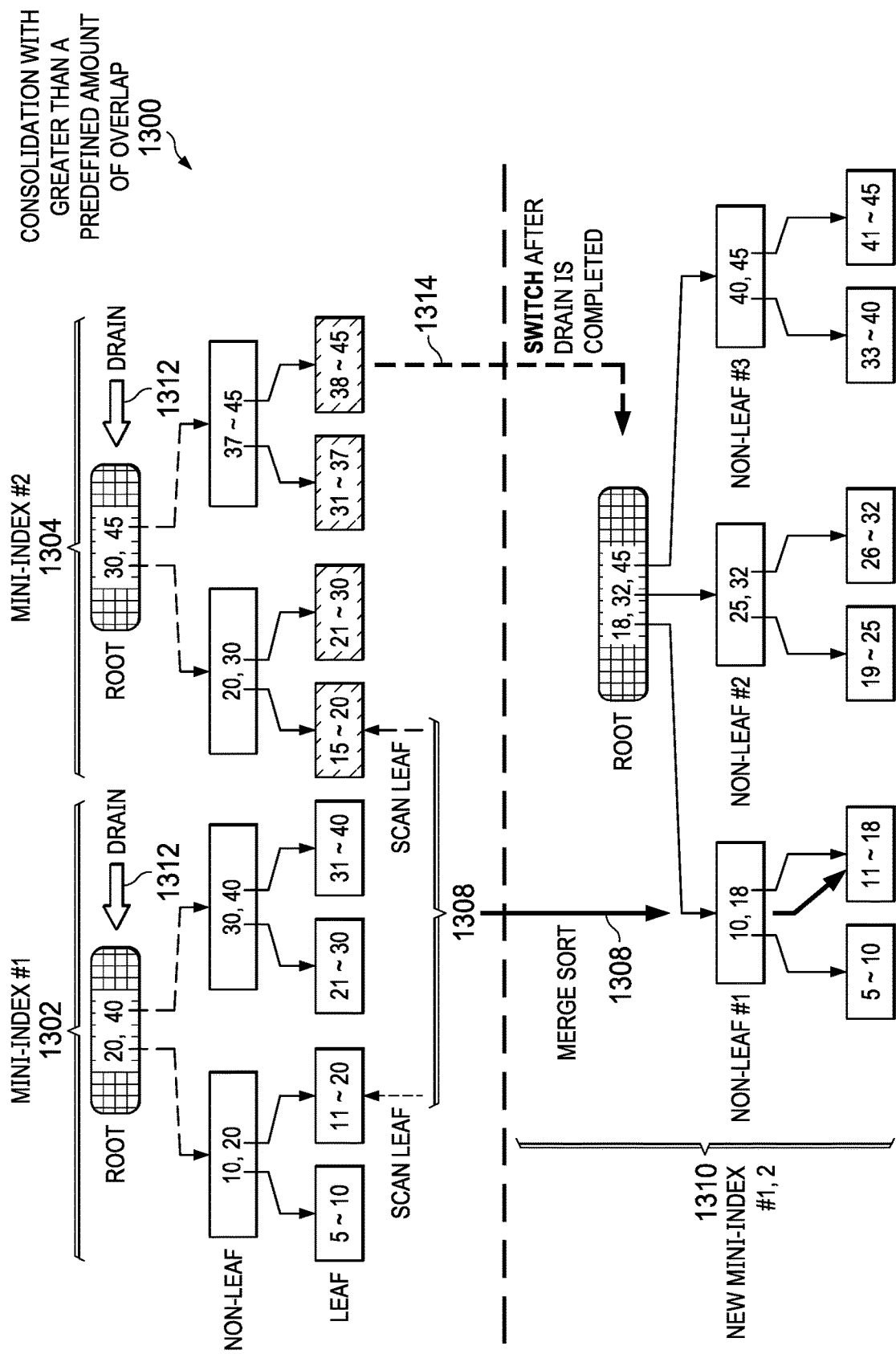
FIG. 13B is a diagram illustrating a continuation of the consolidation with greater than the predefined amount of overlap process shown in FIG. 13A in accordance with an illustrative embodiment.

With reference now to FIG. 13B, a diagram illustrating a continuation of the consolidation with greater than the predefined amount of overlap process shown in FIG. 13A is depicted in accordance with an illustrative embodiment. In response to performing scan leaf and merge sort process

1308 to build new mini-index #1, 2 1310 from mini-index #1 1302 and mini-index #2 1304, the database manager, at 1312, performs a drain action on both mini-index #1 1302 and mini-index #2 1304 upon completion of all existing transactions against mini-index #1 1302 and mini-index #2 1304. At 1314, in response to the database manager completing the drain action on mini-index #1 1302 and mini-index #2 1304, the database manager performs a switch action to new mini-index #1, 2 1310 to perform all new incoming transactions against new mini-index #1, 2 1310.

Figure 14:
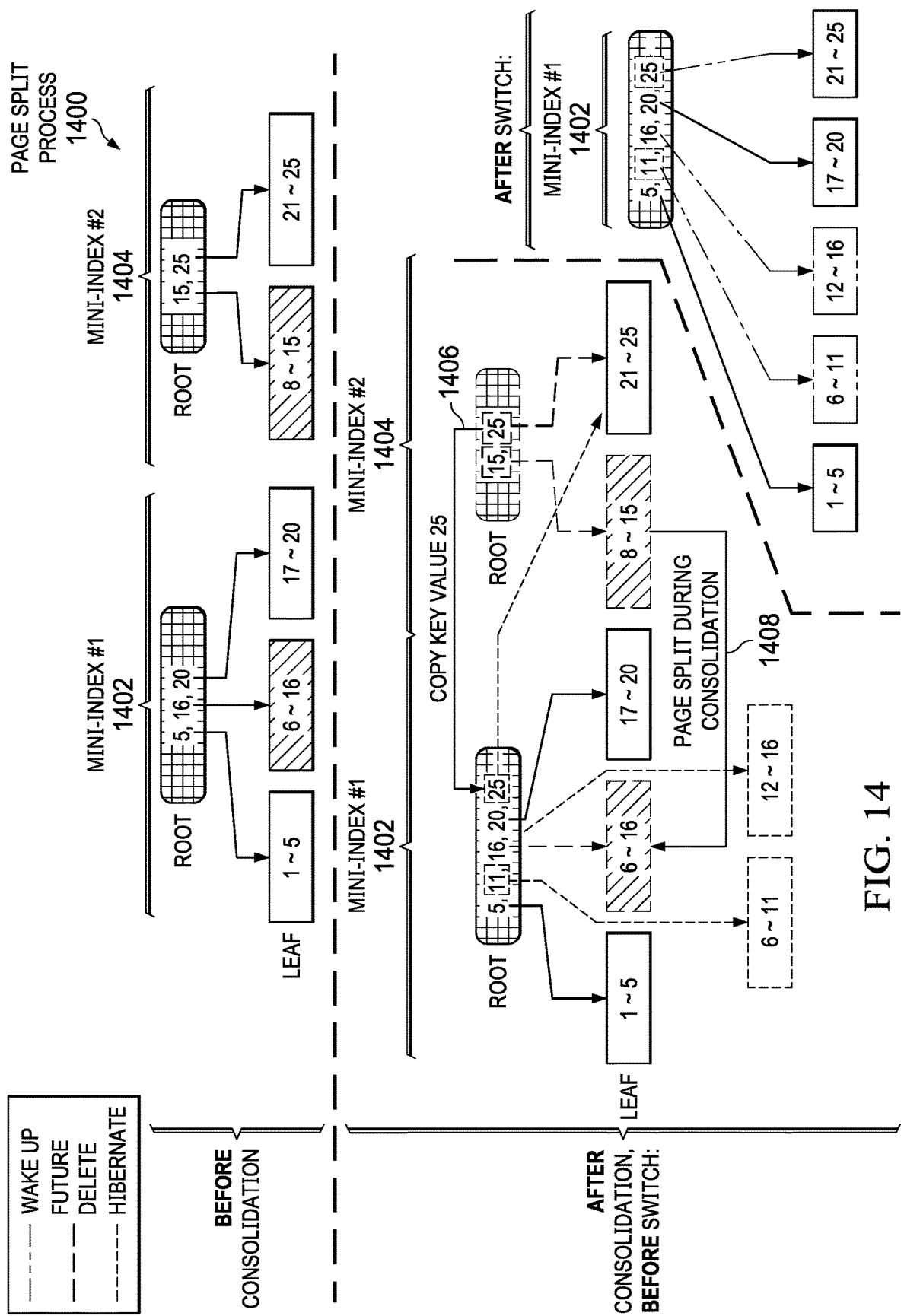
FIG. 14 is a diagram illustrating an example of a page split process in accordance with an illustrative embodiment.

With reference now to FIG. 14, a diagram illustrating an example of a page split process is depicted in accordance with an illustrative embodiment. Page split process 1400 may be implemented by a database manager, such as, for example, database manager 218 in FIG. 2. In this example, page split process 1400 includes mini-index #1 1402 and mini-index #2 1404. At 1406, the database manager copies key value 25 from the root page of mini-index #2 1404 to the root page of mini-index #1 1402. In addition, the database manager copies key values 8 to 15 from a leaf page of mini-index #2 1404 to the leaf page of mini-index #1 1402. At 1408, in response to the database manager determining that the leaf page, which contains key values 6 to 16, is full in mini-index #1 1402, the database manager performs a page split of that leaf page during the consolidation process to form two new leaf pages containing key values 6 to 11 and 12 to 16, respectively. After performing all existing transactions against mini-index #1 1402 and mini-index #2 1404, the database manager removes all pages marked for future deletion and wakes up all key values and pages marked as hibernate. Thus, illustrative embodiments enable page split operations during consolidation of two mini-indexes without mini-index access suspension.

Figure 15:
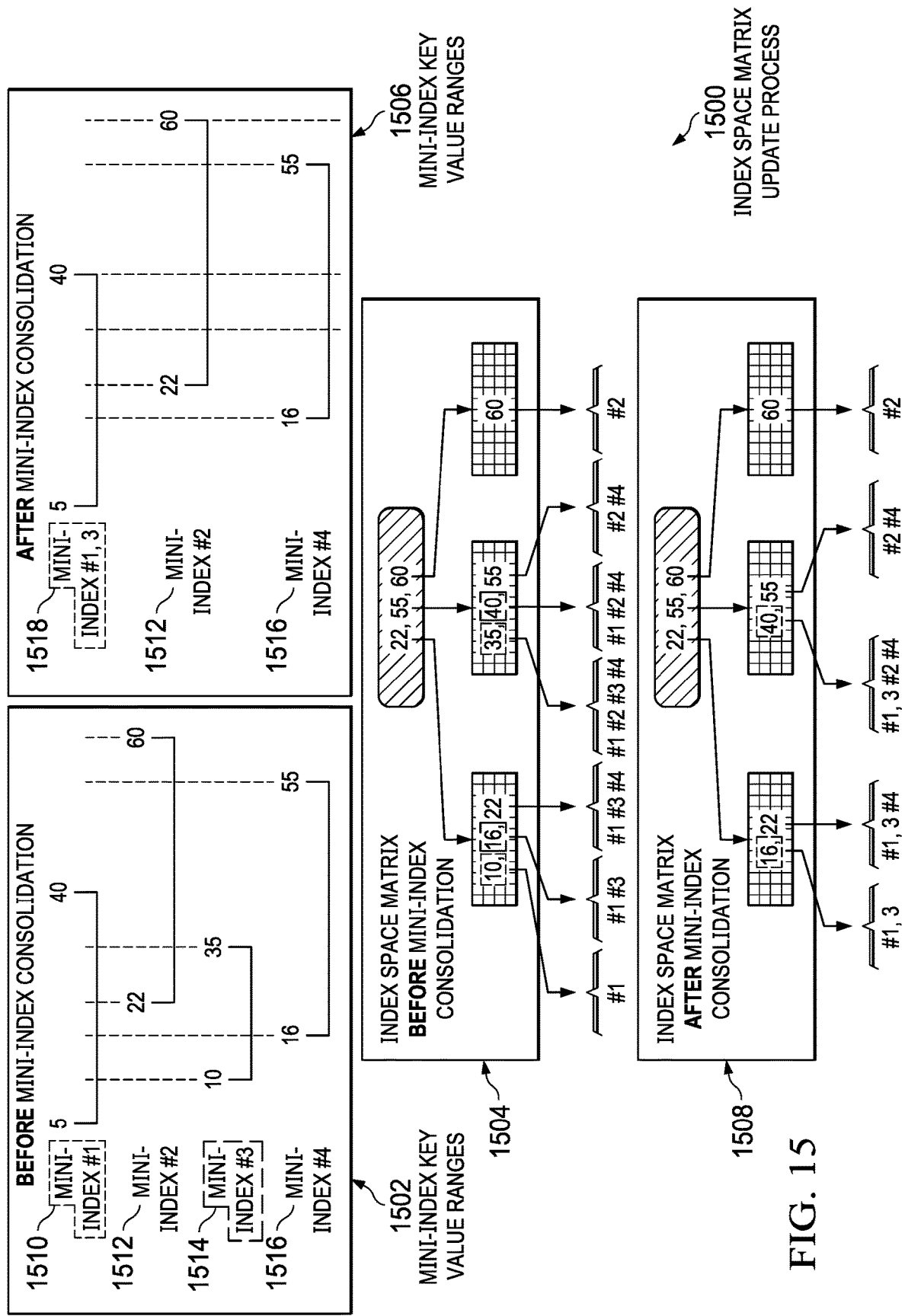
FIG. 15 is a diagram illustrating an example of an index space matrix update process in accordance with an illustrative embodiment.

With reference now to FIG. 15, a diagram illustrating an example of an index space matrix update process is depicted in accordance with an illustrative embodiment. Index space matrix update process 1500 may be implemented by a database manager, such as, for example, database manager 218 in FIG. 2. The database manager performs index space matrix update process 1500 after each consolidation of two mini-indices.

In this example, index space matrix update process 1500 includes mini-index key value ranges 1502, which correspond to index space matrix 1504 representing the index space matrix before mini-index consolidation, and mini-index key value ranges 1506, which correspond to index space matrix 1508 representing the index space matrix after mini-index consolidation. Mini-index key value ranges 1502 before mini-index consolidation are 5 to 40 for mini-index #1 1510, 22 to 60 for mini-index #2 1512, 10 to 35 for mini-index #3 1514, and 16 to 55 for mini-index #4 1516. In this example, the database manager is consolidating mini-index #1 1510 and mini-index #3 1514. As a result, mini-index key value ranges 1506 after mini-index consolidation are 5 to 40 for mini-index #1, 3 1518, 22 to 60 for mini-index #2 1512, and 16 to 55 for mini-index #4 1516.

Figure 16:
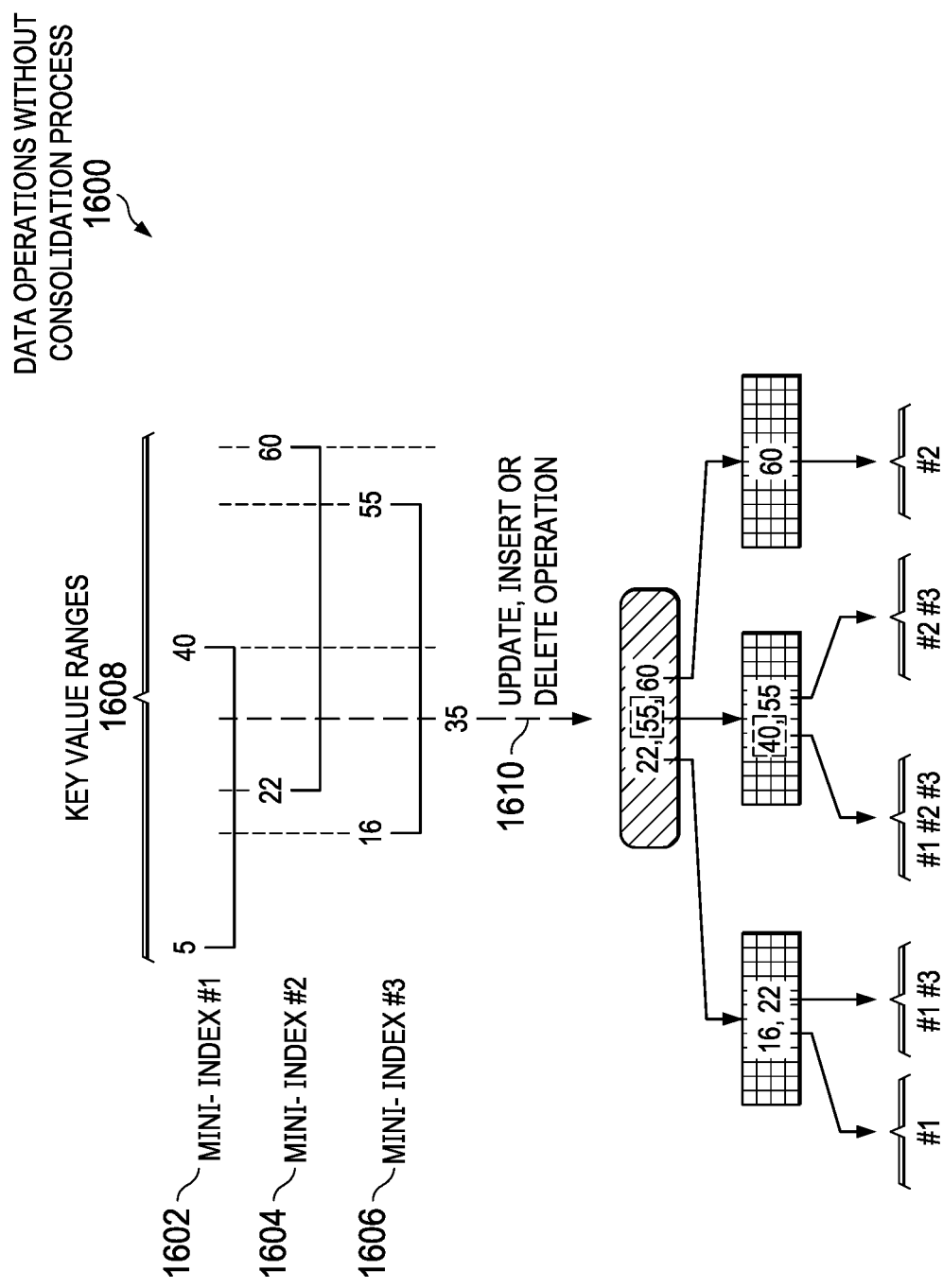
FIG. 16 is a diagram illustrating an example of a data operations without consolidation process in accordance with an illustrative embodiment.

With reference now to FIG. 16, a diagram illustrating an example of a data operations without consolidation process is depicted in accordance with an illustrative embodiment. Data operations without consolidation process 1600 may be implemented by a database manager, such as, for example, database manager 218 in FIG. 2. In this example, data operations without consolidation process 1600 includes mini-index #1 1602, mini-index #2 1604, mini-index #3 1606, and key value ranges 1608. Key value ranges 1608 are 5 to 40 for mini-index #1 1602, 22 to 60 for mini-index #2 1604, and 16 to 55 for mini-index #3 1606.

At 1610, the database manager performs one of an update, insert, or a delete operation associated with key value 35, which corresponds to an incoming transaction. The database manager performs data update, delete, and insert operations against the table space during mini-index access to maintain data consistency. In this example, the database manager is performing one of a data update, delete, or insert operation when no mini-index consolidation is being performed (e.g., when no consolidation is currently being performed on any of mini-index #1 1602, mini-index #2 1604, or mini-index #3 1606).

For a data insert operation on a non-unique mini-index, the database manager can insert key value 35 into any of mini-index #1 1602, mini-index #2 1604, or mini-index #3 1606 depending on whether a mini-index leaf page is available for inserting key value 35. For a data insert operation on a unique mini-index, the database manager searches each of mini-index #1 1602, mini-index #2 1604, and mini-index #3 1606 to make sure no duplicate key value 35 exists and, if no duplicate key value 35 exists, then the database manager inserts key value 35 into any of mini-index #1 1602, mini-index #2 1604, or mini-index #3 1606 depending on whether a mini-index leaf page is available for inserting key value 35. It should be noted that a unique mini-index does not allow duplicate (i.e., overlapping) key values. In contrast, a non-unique mini-index can include a key value that is duplicated. For a data delete operation on either a non-unique or a unique mini-index, the database manager searches mini-index #1 1602, mini-index #2 1604, and mini-index #3 1606 until key value 35 and a corresponding row identifier is found for the data deletion operation. For a data update operation, the database manager first deletes the old value and then insert new value corresponding to the data update operation.

Figure 17:
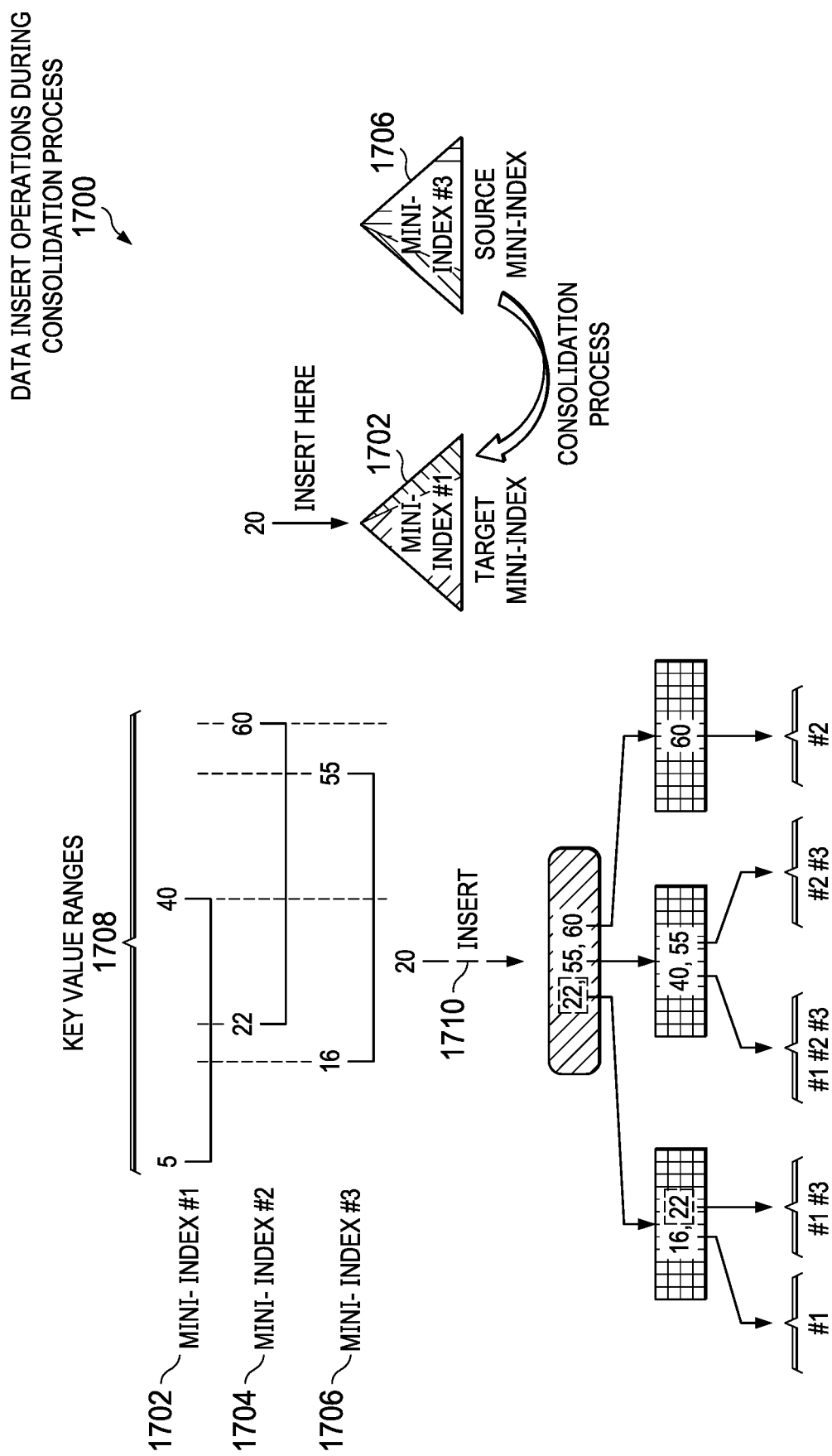
FIG. 17 is a diagram illustrating an example of a data insert operation during consolidation process in accordance with an illustrative embodiment.

With reference now to FIG. 17, a diagram illustrating an example of a data insert operation during consolidation process is depicted in accordance with an illustrative embodiment. Data insert operation during consolidation process 1700 may be implemented by a database manager, such as, for example, database manager 218 in FIG. 2. In this example, data insert operation during consolidation process 1700 includes mini-index #1 1702, mini-index #2 1704, mini-index #3 1706, and key value ranges 1708. Key value ranges 1708 are 5 to 40 for mini-index #1 1702, 22 to 60 for mini-index #2 1704, and 16 to 55 for mini-index #3 1706.

At 1710, the database manager performs an insert operation associated with key value 20, which corresponds to an incoming transaction, during consolidation of mini-index #3 1706 into mini-index #1 1702. The database manager performs the data insert operation against the table space during mini-index access to maintain data consistency. For an insert operation during consolidation of the mini-indices, the database manager follows the same insert rules for unique and non-unique mini-indices as described in the example of FIG. 16 above to locate a candidate mini-index and leaf page for the data insert operation of key value 20. In addition, the database manager ensures that the candidate mini-index (i.e., mini-index #1 1702) is the target mini-index.

Figure 18:
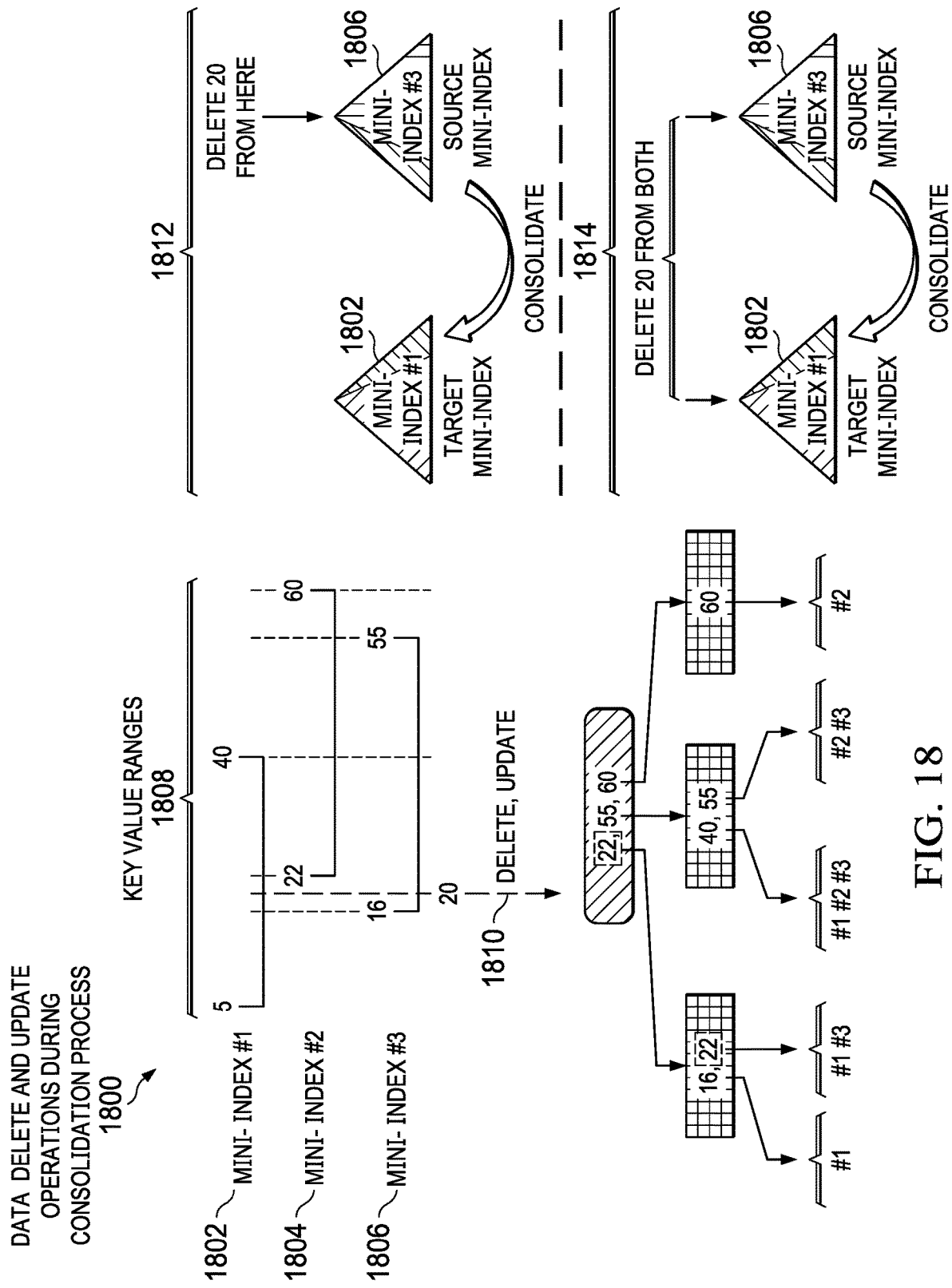
FIG. 18 is a diagram illustrating an example of a data delete and update operations during consolidation process in accordance with an illustrative embodiment.

With reference now to FIG. 18, a diagram illustrating an example of a data delete and update operations during consolidation process is depicted in accordance with an illustrative embodiment. Data delete and update operations during consolidation process 1800 may be implemented by a database manager, such as, for example, database manager 218 in FIG. 2. In this example, data delete and update operations during consolidation process 1800 includes mini-index #1 1802, mini-index #2 1804, mini-index #3 1806, and key value ranges 1808. Key value ranges 1808 are 5 to 40 for mini-index #1 1802, 22 to 60 for mini-index #2 1804, and 16 to 55 for mini-index #3 1806.

At 1810, the database manager performs one of a data delete or update operation associated with key value 20, which corresponds to an incoming transaction, during consolidation of mini-index #3 1806 into mini-index #1 1802. The database manager performs the data delete and update operations against the table space during mini-index access to maintain data consistency.

For the data delete operation during consolidation of the mini-indices, at 1812, if key value 20 has not yet been copied into mini-index #1 1802 from mini-index #3 1806, then the database manager only deletes key value 20 from source mini-index #3 1806. However, if key value 20 has already been copied into mini-index #1 1802 from mini-index #3 1806, then the database manager deletes key value 20 from both target mini-index #1 1802 and mini-index #3 1806. It should be noted that the database manager utilizes a future delete flag to determine whether a "to be deleted" key value is already copied from the source mini-index (e.g., mini-index #3 1806) to the target mini-index (e.g., mini-index #1 1802). For an update operation during consolidation of the mini-indices, the database manager first deletes the old value and then inserts the new value.

Figure 19:
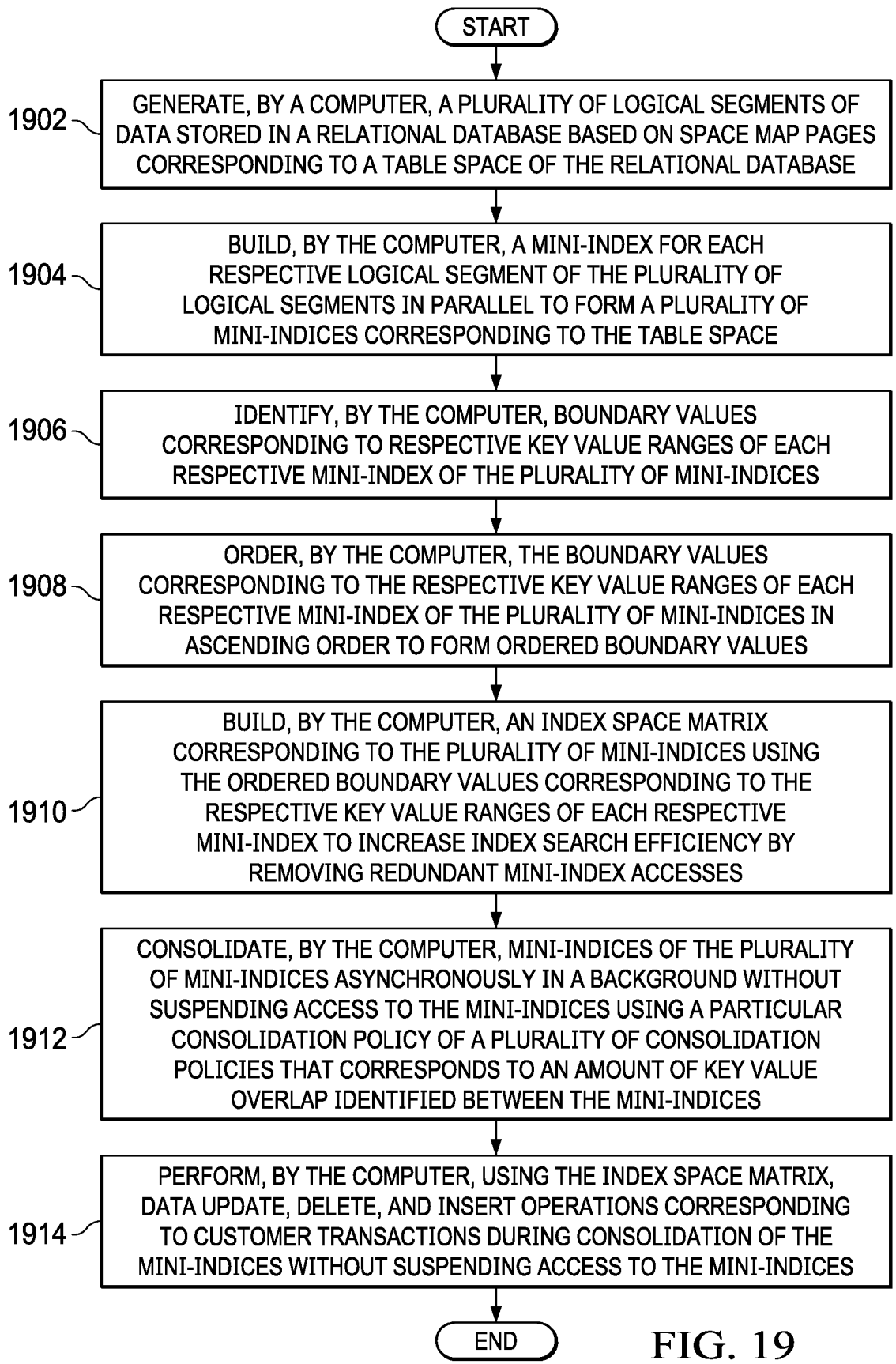
FIG. 19 is a flowchart illustrating a process for increasing index search efficiency and availability in accordance with an illustrative embodiment.

With reference now to FIG. 19, a flowchart illustrating a process for increasing index search efficiency and availability is shown in accordance with an illustrative embodiment. The process shown in FIG. 19 may be implemented in a computer, such as, for example, server 104 in FIG. 1 or data processing system 200 in FIG. 2. For example, the process shown in FIG. 19 may be implemented in database manager 218 in FIG. 2.

The process begins when the computer generates a plurality of logical segments of data stored in a relational database based on space map pages corresponding to a table space of the relational database (step 1902). In addition, the computer builds a mini-index for each respective logical segment of the plurality of logical segments in parallel to form a plurality of mini-indices corresponding to the table space (step 1904). Further, the computer identifies boundary values corresponding to respective key value ranges of each respective mini-index of the plurality of mini-indices (step 1906).

Afterward, the computer orders the boundary values corresponding to the respective key value ranges of each respective mini-index of the plurality of mini-indices in ascending order to form ordered boundary values (step 1908). The computer builds an index space matrix corresponding to the plurality of mini-indices using the ordered boundary values corresponding to the respective key value ranges of each respective mini-index to increase index search efficiency by removing redundant mini-index accesses (step 1910).

The computer consolidates mini-indices of the plurality of mini-indices asynchronously in a background without suspending access to the mini-indices using a particular consolidation policy of a plurality of consolidation policies that corresponds to an amount of key value overlap identified between the mini-indices (step 1912). The computer, using the index space matrix, performs data update, delete, and insert operations corresponding to customer transactions during consolidation of the mini-indices without suspending access to the mini-indices (step 1914). Thereafter, the process terminates.

Figure 20:
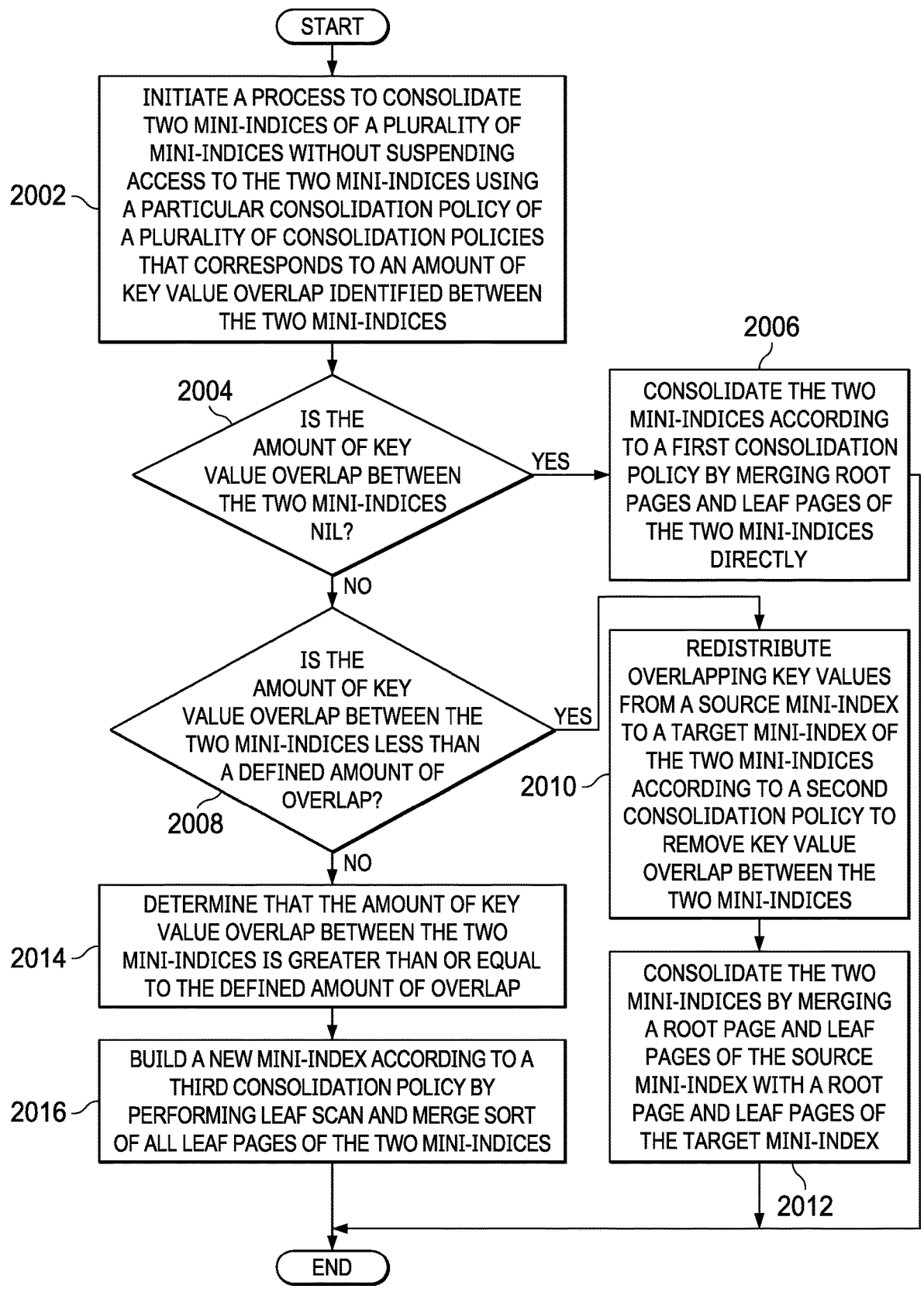
FIG. 20 is a flowchart illustrating a process for consolidating mini-indices according to consolidation policies in accordance with an illustrative embodiment.

With reference now to FIG. 20, a flowchart illustrating a process for consolidating mini-indices according to consolidation policies is shown in accordance with an illustrative embodiment. The process shown in FIG. 20 may be implemented in a computer, such as, for example, server 104 in FIG. 1 or data processing system 200 in FIG. 2. For example, the process shown in FIG. 20 may be implemented in database manager 218 in FIG. 2.

The process begins when the computer initiates a process to consolidate two mini-indices of a plurality of mini-indices without suspending access to the two mini-indices using a particular consolidation policy of a plurality of consolidation policies that corresponds to an amount of key value overlap identified between the two mini-indices (step 2002). In response to initiating the process to consolidate the two mini-indices, the computer makes a determination as to whether the amount of key value overlap identified between the two mini-indices is nil (step 2004). If the computer determines that the amount of key value overlap identified between the two mini-indices is nil, yes output of step 2004, then the computer consolidates the two mini-indices according to a first consolidation policy by merging root pages and leaf pages of the two mini-indices directly (step 2006). Thereafter the process terminates. If the computer determines that the amount of key value overlap identified between the two mini-indices is not nil, no output of step 2004, then the computer makes a determination as to whether the amount of key value overlap identified between the two mini-indices is less than a defined amount of overlap (step 2008).

If the computer determines that the amount of key value overlap identified between the two mini-indices is less than the defined amount of overlap, yes output of step 2008, then the computer redistributes overlapping key values from a source mini-index to a target mini-index of the two mini-indices according to a second consolidation policy to remove key value overlap between the two mini-indices (step 2010). After removing the key value overlap between the two mini-indices, the computer consolidates the two mini-indices by merging a root page and leaf pages of the source mini-index with a root page and leaf pages of the target mini-index (step 2012). Thereafter the process terminates.

Returning again to step 2008, if the computer determines that the amount of key value overlap identified between the two mini-indices is not less than the defined amount of overlap, no output of step 2008, then the computer determines that the amount of key value overlap identified between the two mini-indices is greater than or equal to the defined amount of overlap (step 2014). In response to determining that the amount of key value overlap identified between the two mini-indices is greater than or equal to the defined amount of overlap, the computer builds a new mini-index according to a third consolidation policy by performing leaf scan and merge sort of all leaf pages of the two mini-indices (step 2016). Thereafter the process terminates.

Figure 21:
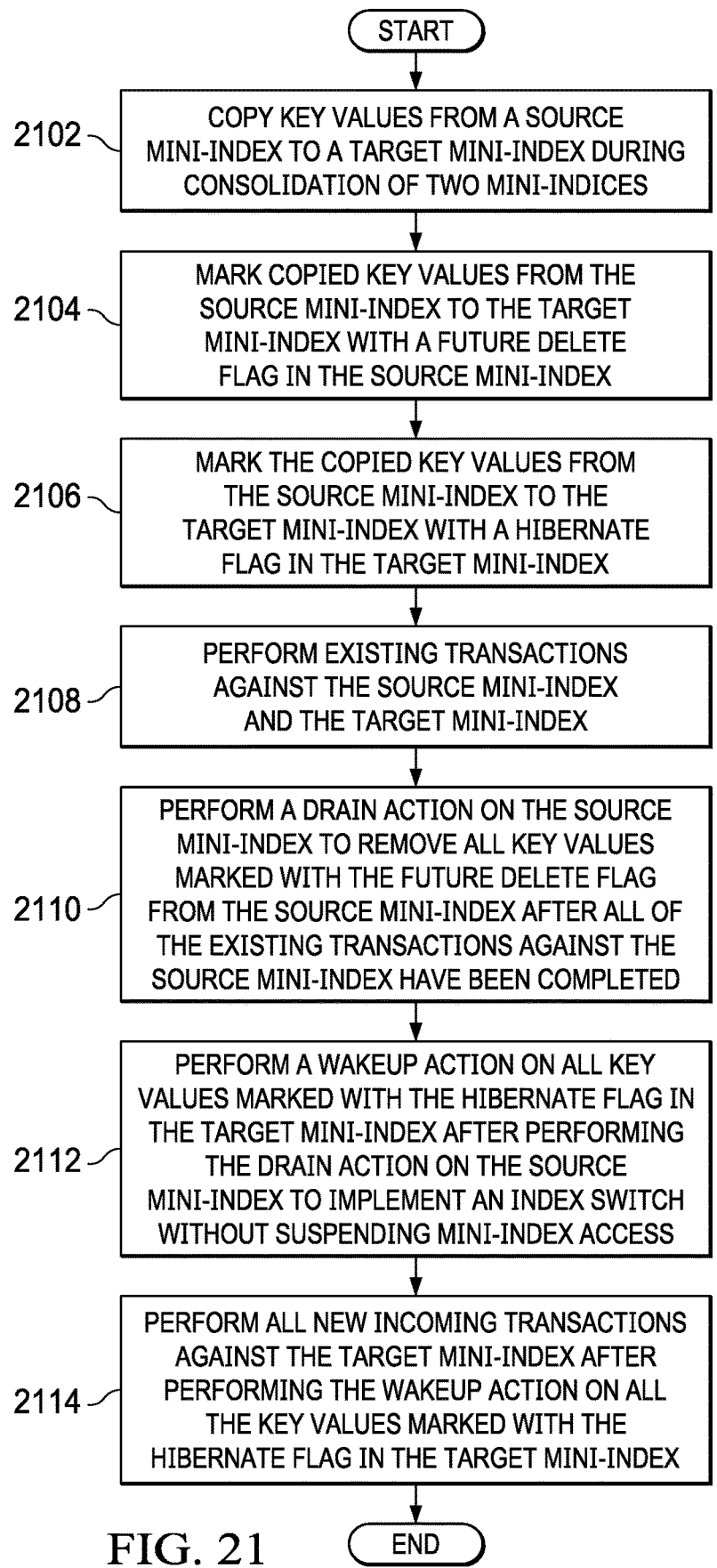
FIG. 21 is a flowchart illustrating a process for maintaining mini-index availability during mini-index consolidation in accordance with an illustrative embodiment.

With reference now to FIG. 21, a flowchart illustrating a process for maintaining mini-index availability during mini-index consolidation is shown in accordance with an illustrative embodiment. The process shown in FIG. 21 may be implemented in a computer, such as, for example, server 104 in FIG. 1 or data processing system 200 in FIG. 2. For example, the process shown in FIG. 21 may be implemented in database manager 218 in FIG. 2.

The process begins when the computer copies key values from a source mini-index to a target mini-index during consolidation of two mini-indices (step 2102). After copying the key values from the source mini-index to the target mini-index, the computer marks copied key values from the source mini-index to the target mini-index with a future delete flag in the source mini-index (step 2104). In addition, the computer marks the copied key values from the source mini-index to the target mini-index with a hibernate flag in the target mini-index (step 2106). Further, the computer performs existing transactions against the source mini-index and the target mini-index (step 2108).

Subsequently, the computer performs a drain action on the source mini-index to remove all key values marked with the future delete flag from the source mini-index after all of the existing transactions against the source mini-index have been completed (step 2110). The computer also performs a wakeup action on all key values marked with the hibernate flag in the target mini-index after performing the drain action on the source mini-index to implement an index switch without suspending mini-index access (step 2112). Moreover, the computer performs all new incoming transactions against the target mini-index (step 2114). Thereafter, the process terminates.

Thus, illustrative embodiments of the present invention provide a computer-implemented method, computer system, and computer program product for increasing index availability and system performance in a relational database when an index for the relational database is reorganized, dropped, or imported by logically dividing the index into a plurality of mini-indices and then consolidating the mini-indices while continuing to allow data update, delete, and insert operations corresponding to customer transactions on the table space of the relational database during consolidation of the mini-indices. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for increasing index search efficiency and availability in a database, the computer-implemented method comprising:
building, by a computer, an index space matrix corresponding to a plurality of mini-indices of the database using ordered boundary values that correspond to key value ranges of each respective mini-index to increase index search efficiency by removing redundant mini-index accesses;
consolidating, by the computer, mini-indices of the plurality of mini-indices asynchronously without suspending access to the mini-indices using a particular consolidation policy of a plurality of consolidation policies that corresponds to an amount of key value overlap identified between the mini-indices;
performing, by the computer, using the index space matrix, data operations corresponding to transactions during consolidation of the mini-indices without suspending access to the mini-indices;
initiating, by the computer, consolidation of the mini-indices of the plurality of mini-indices without suspending access to the mini-indices using the particular consolidation policy of the plurality of consolidation policies that corresponds to the amount of key value overlap identified between the mini-indices;
determining, by the computer, whether the amount of key value overlap identified between the mini-indices is nil; and
responsive to the computer determining that the amount of key value overlap identified between the mini-indices is nil, consolidating, by the computer, the mini-indices according to a first consolidation policy by merging root pages and leaf pages of the mini-indices directly.

2. The computer-implemented method of claim 1 further comprising:
generating, by the computer, a plurality of logical segments of data stored in the database based on space map pages corresponding to a table space of the database; and
building in parallel, by the computer, a mini-index for each respective logical segment of the plurality of logical segments generated based on the space map pages corresponding to the table space of the database to form the plurality of mini-indices corresponding to the table space of the database.

3. The computer-implemented method of claim 1 further comprising:
identifying, by the computer, boundary values corresponding to the key value ranges of each respective mini-index of the plurality of mini-indices; and
ordering, by the computer, the boundary values corresponding to the key value ranges of each respective mini-index of the plurality of mini-indices in ascending order to form the ordered boundary values.

4. The computer-implemented method of claim 1 further comprising:
responsive to the computer determining that the amount of key value overlap identified between the mini-indices is not nil, determining, by the computer, whether the amount of key value overlap identified between the mini-indices is less than a defined amount of overlap;
responsive to the computer determining that the amount of key value overlap identified between the mini-indices is less than the defined amount of overlap, redistributing, by the computer, overlapping key values from a source mini-index to a target mini-index of the mini-indices according to a second consolidation policy to remove key value overlap between the mini-indices; and
responsive to removing the key value overlap between the mini-indices, consolidating, by the computer, the mini-indices by merging a root page and leaf pages of the source mini-index with a root page and leaf pages of the target mini- index.

5. The computer-implemented method of claim 4 further comprising:
responsive to the computer determining that the amount of key value overlap identified between the mini-indices is not less than the defined amount of overlap, determining, by the computer, that the amount of key value overlap identified between the mini-indices is greater than or equal to the defined amount of overlap; and
responsive to the computer determining that the amount of key value overlap identified between the mini-indices is greater than or equal to the defined amount of overlap, building, by the computer, a new mini-index according to a third consolidation policy by performing leaf scan and merge sort of all leaf pages of the mini-indices.

6. The computer-implemented method of claim 1 further comprising:
copying, by the computer, key values from a source mini-index to a target mini-index during consolidation of the mini-indices; and
responsive to the computer copying the key values from the source mini-index to the target mini-index, marking, by the computer, copied key values from the source mini-index to the target mini-index with a future delete flag in the source mini-index and marking, by the computer, the copied key values from the source mini-index to the target mini-index with a hibernate flag in the target mini-index.

7. The computer-implemented method of claim 6 further comprising:
performing, by the computer, existing transactions against the source mini-index and the target mini-index; and
performing, by the computer, a drain action on the source mini-index to remove key values marked with the future delete flag from the source mini-index in response to the existing transactions against the source mini-index having been completed.

8. The computer-implemented method of claim 7 further comprising:
performing, by the computer, a wakeup action on key values marked with the hibernate flag in the target mini-index in response to performing the drain action on the source mini-index to implement an index switch without suspending mini-index access; and
performing, by the computer, new incoming transactions against the target mini-index in response to performing the wakeup action on the key values marked with the hibernate flag in the target mini-index.

9. A computer system for increasing index search efficiency and availability in a database, the computer system comprising:
a bus system;
a storage device connected to the bus system, wherein the storage device stores program instructions; and
a processor connected to the bus system, wherein the processor executes the program instructions to:
build an index space matrix corresponding to a plurality of mini-indices of the database using ordered boundary values that correspond to key value ranges of each respective mini-index to increase index search efficiency by removing redundant mini-index accesses;
consolidate mini-indices of the plurality of mini-indices asynchronously without suspending access to the mini-indices using a particular consolidation policy of a plurality of consolidation policies that corresponds to an amount of key value overlap identified between the mini-indices;
perform, using the index space matrix, data operations corresponding to transactions during consolidation of the mini-indices without suspending access to the mini-indices;
initiate consolidation of the mini-indices of the plurality of mini-indices without suspending access to the mini-indices using the particular consolidation policy of the plurality of consolidation policies that corresponds to the amount of key value overlap identified between the mini-indices;
determine whether the amount of key value overlap identified between the mini-indices is nil; and
consolidate the mini-indices according to a first consolidation policy by merging root pages and leaf pages of the mini-indices directly in response to determining that the amount of key value overlap identified between the mini-indices is nil.

10. The computer system of claim 9, wherein the processor further executes the program instructions to:
generate a plurality of logical segments of data stored in the database based on space map pages corresponding to a table space of the database; and
build in parallel a mini-index for each respective logical segment of the plurality of logical segments generated based on the space map pages corresponding to the table space of the database to form the plurality of mini-indices corresponding to the table space of the database.

11. The computer system of claim 9, wherein the processor further executes the program instructions to:
identify boundary values corresponding to the key value ranges of each respective mini-index of the plurality of mini-indices; and
order the boundary values corresponding to the key value ranges of each respective mini-index of the plurality of mini-indices in ascending order to form the ordered boundary values.

12. The computer system of claim 9, wherein the processor further executes the program instructions to:
determine whether the amount of key value overlap identified between the mini-indices is less than a defined amount of overlap in response to determining that the amount of key value overlap identified between the mini-indices is not nil;
redistribute overlapping key values from a source mini-index to a target mini-index of the mini-indices according to a second consolidation policy to remove key value overlap between the mini-indices and consolidate the mini-indices by merging a root page and leaf pages of the source mini-index with a root page and leaf pages of the target mini-index in response to determining that the amount of key value overlap identified between the mini-indices is less than the defined amount of overlap;
determine that the amount of key value overlap identified between the mini-indices is greater than or equal to the defined amount of overlap in response to determining that the amount of key value overlap identified between the mini-indices is not less than the defined amount of overlap; and
build a new mini-index according to a third consolidation policy by performing leaf scan and merge sort of all leaf pages of the mini-indices in response to determining that the amount of key value overlap identified between the mini-indices is greater than or equal to the defined amount of overlap.

13. A computer program product for increasing index search efficiency and availability in a database, the computer program product comprising a computer-readable storage medium having program instructions embodied therewith, the program instructions executable by a computer to cause the computer to perform a method of:
building, by a computer, an index space matrix corresponding to a plurality of mini-indices of the database using ordered boundary values that correspond to key value ranges of each respective mini-index to increase index search efficiency by removing redundant mini-index accesses;

consolidating, by the computer, mini-indices of the plurality of mini-indices asynchronously without suspending access to the mini-indices using a particular consolidation policy of a plurality of consolidation policies that corresponds to an amount of key value overlap identified between the mini-indices;

performing, by the computer, using the index space matrix, data operations corresponding to transactions during consolidation of the mini-indices without suspending access to the mini-indices;

initiating, by the computer, consolidation of the mini-indices of the plurality of mini-indices without suspending access to the mini-indices using the particular consolidation policy of the plurality of consolidation policies that corresponds to the amount of key value overlap identified between the mini-indices;

determining, by the computer, whether the amount of key value overlap identified between the mini-indices is nil; and responsive to the computer determining that the amount of key value overlap identified between the mini-indices is nil, consolidating, by the computer, the mini-indices according to a first consolidation policy by merging root pages and leaf pages of the mini-indices directly.

14. The computer program product of claim 13 further comprising:

generating, by the computer, a plurality of logical segments of data stored in the database based on space map pages corresponding to a table space of the database; and building in parallel, by the computer, a mini-index for each respective logical segment of the plurality of logical segments generated based on the space map pages corresponding to the table space of the database to form the plurality of mini-indices corresponding to the table space of the database.

15. The computer program product of claim 13 further comprising:

identifying, by the computer, boundary values corresponding to the key value ranges of each respective mini-index of the plurality of mini-indices; and ordering, by the computer, the boundary values corresponding to the key value ranges of each respective mini-index of the plurality of mini-indices in ascending order to form the ordered boundary values.

16. The computer program product of claim 13 further comprising:

responsive to the computer determining that the amount of key value overlap identified between the mini-indices is not nil, determining, by the computer, whether the amount of key value overlap identified between the mini-indices is less than a defined amount of overlap;

responsive to the computer determining that the amount of key value overlap identified between the mini-indices is less than the defined amount of overlap, redistributing, by the computer, overlapping key values from a source mini-index to a target mini-index of the mini-indices according to a second consolidation policy to remove key value overlap between the mini-indices; and responsive to removing the key value overlap between the mini-indices, consolidating, by the computer, the mini-indices by merging a root page and leaf pages of the source mini-index with a root page and leaf pages of the target mini- index.

17. The computer program product of claim 16 further comprising:

responsive to the computer determining that the amount of key value overlap identified between the mini-indices is not less than the defined amount of overlap, determining, by the computer, that the amount of key value overlap identified between the mini-indices is greater than or equal to the defined amount of overlap; and responsive to the computer determining that the amount of key value overlap identified between the mini-indices is greater than or equal to the defined amount of overlap, building, by the computer, a new mini-index according to a third consolidation policy by performing leaf scan and merge sort of all leaf pages of the mini-indices.

18. The computer program product of claim 13 further comprising:

copying, by the computer, key values from a source mini-index to a target mini-index during consolidation of the mini-indices; and responsive to the computer copying the key values from the source mini-index to the target mini-index, marking, by the computer, copied key values from the source mini-index to the target mini-index with a future delete flag in the source mini-index and marking, by the computer, the copied key values from the source mini-index to the target mini-index with a hibernate flag in the target mini-index.

19. The computer program product of claim 18 further comprising:

performing, by the computer, existing transactions against the source mini-index and the target mini-index; and performing, by the computer, a drain action on the source mini-index to remove key values marked with the future delete flag from the source mini-index in response to the existing transactions against the source mini-index having been completed.

20. The computer program product of claim 19 further comprising:

performing, by the computer, a wakeup action on key values marked with the hibernate flag in the target mini-index in response to performing the drain action on the source mini-index to implement an index switch without suspending mini-index access; and performing, by the computer, new incoming transactions against the target mini-index in response to performing the wakeup action on the key values marked with the hibernate flag in the target mini-index.

21. A method for increasing index search efficiency in a database, the method comprising:

identifying boundary values corresponding to key value ranges of respective mini-indices of a plurality of mini-indices of the database;

ordering the boundary values corresponding to the key value ranges of each respective mini-index of the plurality of mini-indices in ascending order to form ordered boundary values;

building an index space matrix corresponding to the plurality of mini-indices of the database using the ordered boundary values that correspond to key value ranges of each respective mini-index to increase index search efficiency by removing redundant mini-index accesses;

consolidating mini-indices of the plurality of mini-indices without suspending access to the mini-indices using a consolidation policy that corresponds to an amount of key value overlap identified between the mini-indices;

performing, using the index space matrix corresponding to the plurality of mini-indices of the database, data operations corresponding to transactions during consolidation of the mini-indices without suspending access to the mini-indices using the index space matrix;

initiating, by the computer, consolidation of the mini-indices of the plurality of mini-indices without suspending access to the mini-indices using the particular consolidation policy of the plurality of consolidation policies that corresponds to the amount of key value overlap identified between the mini-indices;

determining, by the computer, whether the amount of key value overlap identified between the mini-indices is nil; and responsive to the computer determining that the amount of key value overlap identified between the mini-indices is nil, consolidating, by the computer, the mini-indices according to a first consolidation policy by merging root pages and leaf pages of the mini-indices directly.

\* \* \* \* \*